(12) United States Patent
Wada et al.

(10) Patent No.: US 10,440,337 B2
(45) Date of Patent: Oct. 8, 2019

(54) PROJECTION APPARATUS, INFORMATION PROCESSING APPARATUS, AND CONTROL METHODS THEREOF

(71) Applicant: CANON KABUSHIKI KAISHA, Tokyo (JP)

(72) Inventors: Hidetoshi Wada, Yokohama (JP); Masaki Fujioka, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/984,724

(22) Filed: May 21, 2018

(65) Prior Publication Data

US 2018/0343426 A1 Nov. 29, 2018

(30) Foreign Application Priority Data

May 24, 2017 (JP) ................. 2017-102957

(51) Int. Cl.
*H04N 9/31* (2006.01)
*G09G 5/02* (2006.01)
*G06F 3/14* (2006.01)

(52) U.S. Cl.
CPC ......... *H04N 9/3182* (2013.01); *G06F 3/1423* (2013.01); *G09G 5/02* (2013.01); *H04N 9/3185* (2013.01); *H04N 9/3194* (2013.01); *G09G 2320/0626* (2013.01); *G09G 2320/0666* (2013.01)

(58) Field of Classification Search
None
See application file for complete search history.

(56) References Cited

FOREIGN PATENT DOCUMENTS

| JP | 2008-145915 A | 6/2008 |
|----|---------------|--------|
| JP | 2013-167660 A | 8/2013 |
| JP | 2014-235295 A | 12/2014 |

*Primary Examiner* — Vu Nguyen
(74) *Attorney, Agent, or Firm* — Cowan, Liebowitz & Latman, P.C.

(57) ABSTRACT

A projection apparatus, comprises a projection unit configured to project an image onto a screen including a target image, a switching unit configured to switch to one of a first image for indicating a position deviation between a projection area in which the projection unit projects an image and the target image, and a second image for increasing contrast of the target image, and a control unit configured to control the projection unit so as to project an image in the projection area based on an image to which the switching unit has switched, wherein the first image is an image that has a predetermined relationship with colors of the target image.

18 Claims, 19 Drawing Sheets

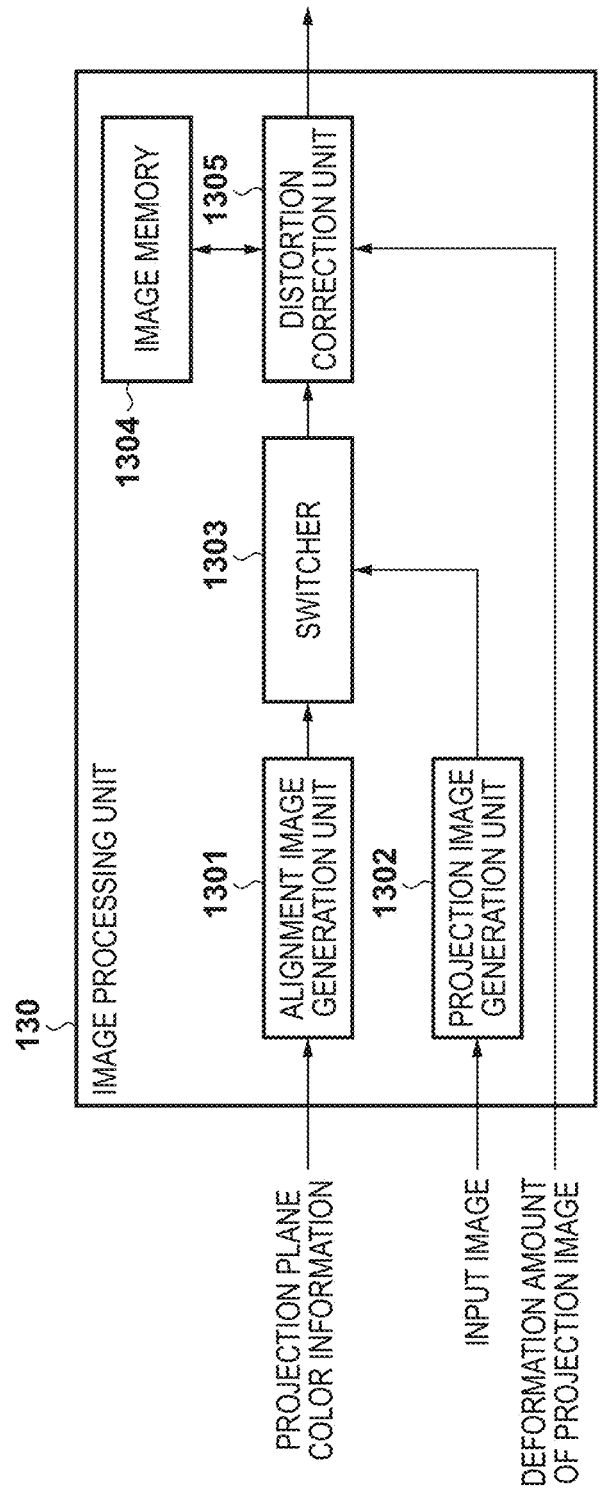

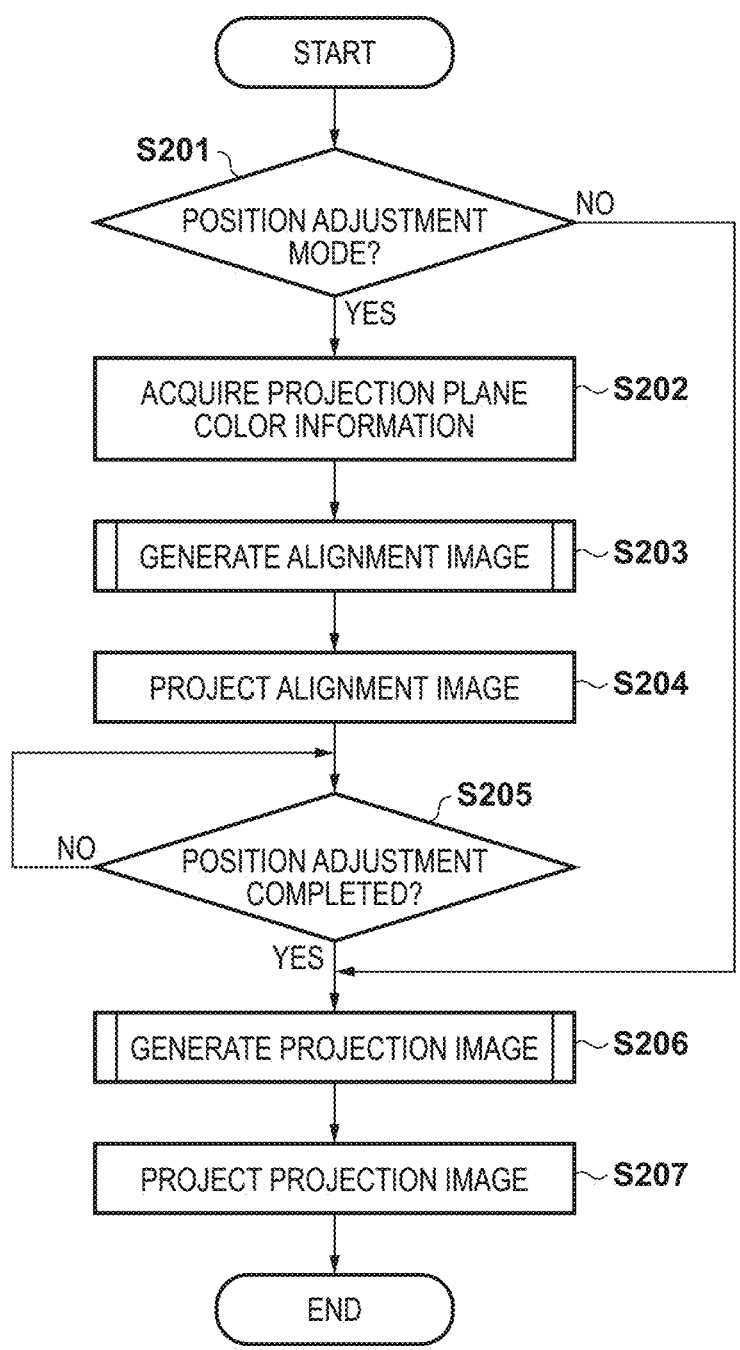

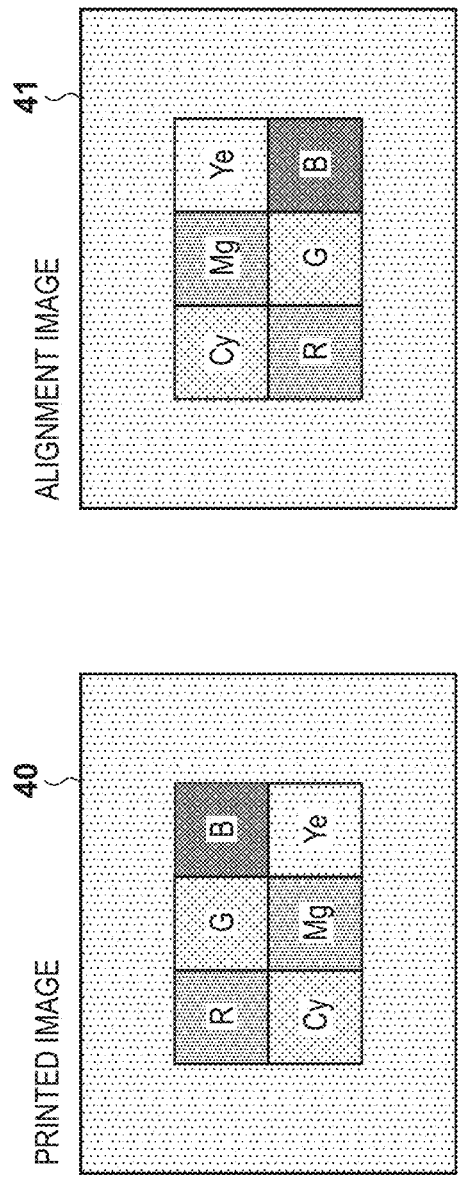

F I G. 7A
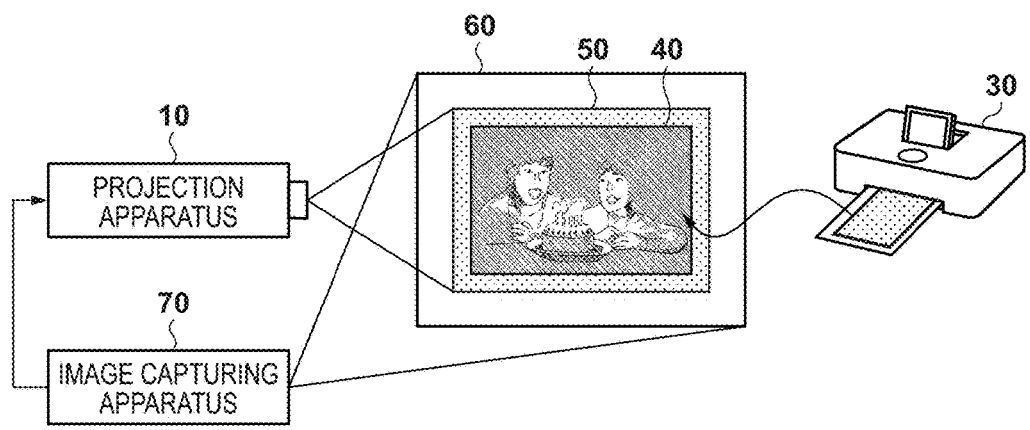

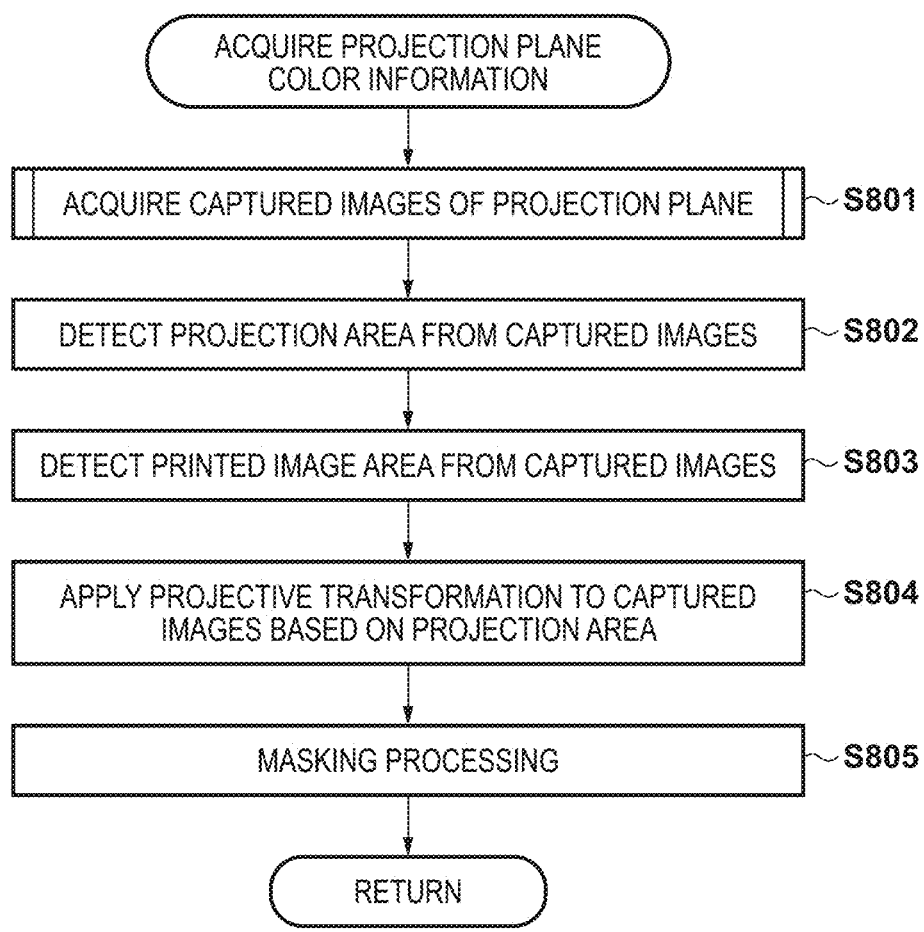

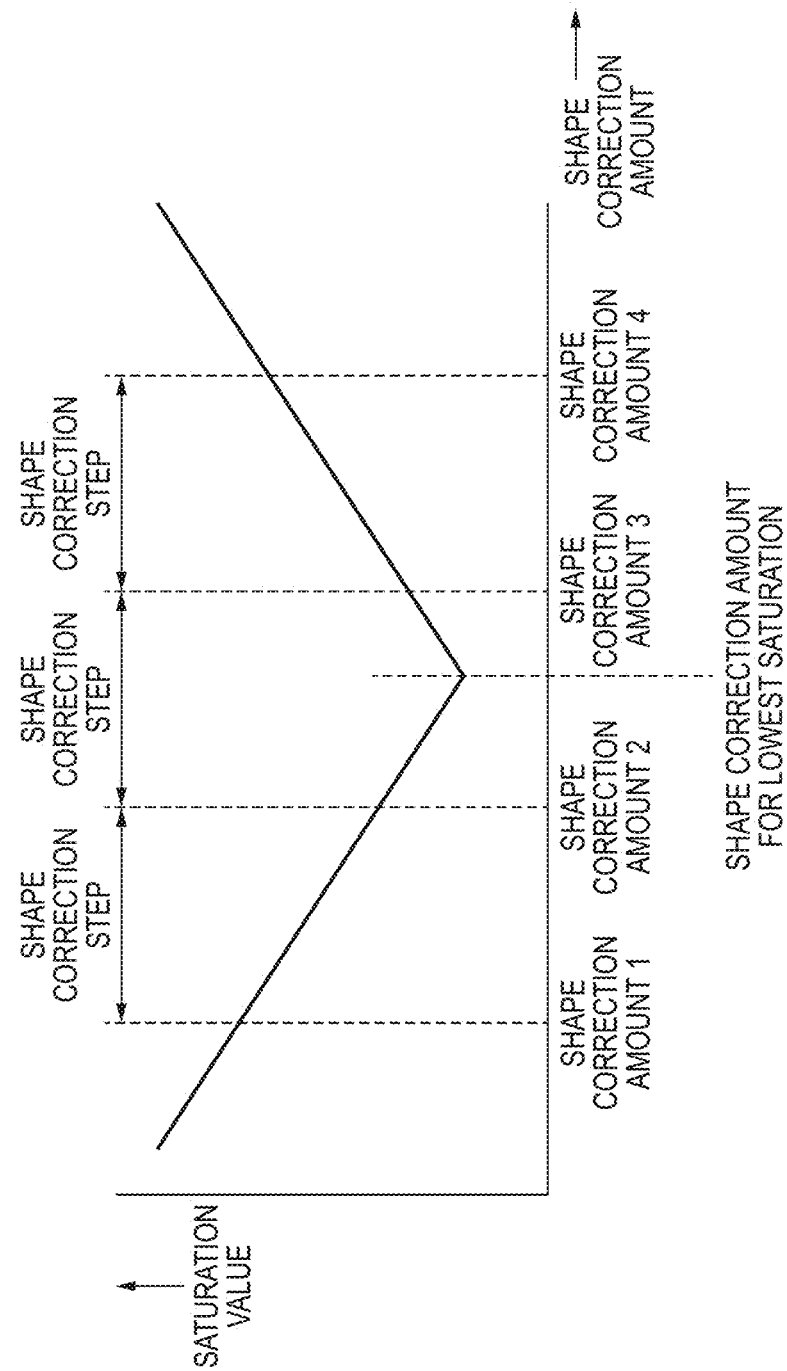

FIG. 14

| IMAGE TYPE | POSITION | COLOR NAME | PIXEL VALUE | | | Lab COORDINATES | | | SATURATION |
|---|---|---|---|---|---|---|---|---|---|
| | | | R | G | B | L* | a* | b* | Cab* |
| PRINTED IMAGE | pos1 | R | 255 | 0 | 0 | 53 | 80 | 67 | 105 |
| | pos2 | G | 0 | 255 | 0 | 88 | -86 | 83 | 120 |
| | pos3 | B | 0 | 0 | 255 | 32 | 79 | -108 | 134 |
| | pos4 | Cy | 0 | 255 | 255 | 91 | -48 | -14 | 50 |
| | pos5 | Mg | 255 | 0 | 255 | 60 | 98 | -61 | 116 |
| | pos6 | Y | 255 | 255 | 0 | 97 | -22 | 94 | 97 |
| ALIGNMENT IMAGE | pos1 | Cy | 0 | 255 | 255 | 91 | -48 | -14 | 50 |
| | pos2 | Mg | 255 | 0 | 255 | 60 | 98 | -61 | 116 |
| | pos3 | Y | 255 | 255 | 0 | 97 | -22 | 94 | 97 |
| | pos4 | R | 255 | 0 | 0 | 53 | 80 | 67 | 105 |
| | pos5 | G | 0 | 255 | 0 | 88 | -86 | 83 | 120 |
| | pos6 | B | 0 | 0 | 255 | 32 | 79 | -108 | 134 |
| OVERLAP IMAGE | pos1 | | 0 | 0 | 0 | 0 | 0 | 0 | 0 |
| | pos2 | | 0 | 0 | 0 | 0 | 0 | 0 | 0 |
| | pos3 | | 0 | 0 | 0 | 0 | 0 | 0 | 0 |
| | pos4 | | 0 | 0 | 0 | 0 | 0 | 0 | 0 |
| | pos5 | | 0 | 0 | 0 | 0 | 0 | 0 | 0 |
| | pos6 | | 0 | 0 | 0 | 0 | 0 | 0 | 0 |

FIG. 15

| IMAGE TYPE | POSITION | COLOR NAME | PIXEL VALUE | | | Lab COORDINATES | | | SATURATION |
|---|---|---|---|---|---|---|---|---|---|
| | | | R | G | B | L* | a* | b* | Cab* |
| PRINTED IMAGE | pos1 | 0.5R + 0.25Gray | 191 | 64 | 64 | 66 | 33 | 14 | 36 |
| | pos2 | 0.5G + 0.25Gray | 64 | 191 | 64 | 82 | −44 | 35 | 56 |
| | pos3 | 0.5B + 0.25Gray | 64 | 64 | 191 | 60 | 21 | −45 | 49 |
| | pos4 | 0.5Cy + 0.25Gray | 64 | 191 | 191 | 84 | −26 | −8 | 28 |
| | pos5 | 0.5Mg + 0.25Gray | 191 | 64 | 191 | 69 | 47 | −31 | 56 |
| | pos6 | 0.5Y + 0.25Gray | 191 | 191 | 64 | 88 | −13 | 43 | 45 |
| ALIGNMENT IMAGE | pos1 | 0.5Cy + 0.25Gray | 64 | 191 | 191 | 84 | −26 | −8 | 28 |
| | pos2 | 0.5Mg + 0.25Gray | 191 | 64 | 191 | 69 | 47 | −31 | 56 |
| | pos3 | 0.5Y + 0.25Gray | 191 | 191 | 64 | 88 | −13 | 43 | 45 |
| | pos4 | 0.5R + 0.25Gray | 191 | 64 | 64 | 66 | 33 | 14 | 36 |
| | pos5 | 0.5G + 0.25Gray | 64 | 191 | 64 | 82 | −44 | 35 | 56 |
| | pos6 | 0.5B + 0.25Gray | 64 | 64 | 191 | 60 | 21 | −45 | 49 |
| OVERLAP IMAGE | pos1 | | 48 | 48 | 48 | 50 | 0 | 0 | 0 |
| | pos2 | | 48 | 48 | 48 | 50 | 0 | 0 | 0 |
| | pos3 | | 48 | 48 | 48 | 50 | 0 | 0 | 0 |
| | pos4 | | 48 | 48 | 48 | 50 | 0 | 0 | 0 |
| | pos5 | | 48 | 48 | 48 | 50 | 0 | 0 | 0 |
| | pos6 | | 48 | 48 | 48 | 50 | 0 | 0 | 0 |

FIG. 16

| IMAGE TYPE | POSITION | COLOR NAME | PIXEL VALUE | | | Lab COORDINATES | | | SATURATION |
|---|---|---|---|---|---|---|---|---|---|
| | | | R | G | B | $L^*$ | $a^*$ | $b^*$ | $C_{ab}^*$ |
| PRINTED IMAGE | pos1 | 0.5R + 0.2Gray | 179 | 52 | 52 | 62 | 36 | 16 | 40 |
| | pos2 | 0.5G + 0.2Gray | 52 | 179 | 52 | 79 | -47 | 38 | 60 |
| | pos3 | 0.5B + 0.2Gray | 52 | 52 | 179 | 56 | 24 | -48 | 54 |
| | pos4 | 0.5Cy + 0.2Gray | 52 | 179 | 179 | 87 | -25 | -8 | 26 |
| | pos5 | 0.5Mg + 0.2Gray | 179 | 52 | 179 | 72 | 43 | -29 | 52 |
| | pos6 | 0.5Y + 0.2Gray | 179 | 179 | 52 | 90 | -12 | 40 | 42 |
| ALIGNMENT IMAGE | pos1 | 0.5Cy + 0.2Gray | 76 | 203 | 203 | 87 | -25 | -8 | 26 |
| | pos2 | 0.5Mg + 0.2Gray | 203 | 76 | 203 | 72 | 43 | -29 | 52 |
| | pos3 | 0.5Y + 0.2Gray | 203 | 203 | 76 | 90 | -12 | 40 | 42 |
| | pos4 | 0.5R + 0.2Gray | 203 | 76 | 76 | 62 | 36 | 16 | 40 |
| | pos5 | 0.5G + 0.2Gray | 76 | 203 | 76 | 79 | -47 | 38 | 60 |
| | pos6 | 0.5B + 0.2Gray | 76 | 76 | 203 | 56 | 24 | -48 | 54 |
| OVERLAP IMAGE | pos1 | | 54 | 41 | 41 | 48 | 6 | 2 | 6 |
| | pos2 | | 41 | 54 | 41 | 51 | -9 | 6 | 11 |
| | pos3 | | 41 | 41 | 54 | 47 | 3 | -8 | 9 |
| | pos4 | | 54 | 41 | 41 | 48 | 6 | 2 | 6 |
| | pos5 | | 41 | 54 | 41 | 51 | -9 | 6 | 11 |
| | pos6 | | 41 | 41 | 54 | 47 | 3 | -8 | 9 |

PROJECTION APPARATUS, INFORMATION PROCESSING APPARATUS, AND CONTROL METHODS THEREOF

BACKGROUND OF THE INVENTION

Field of the Invention

The present invention relates to a technique to project an image onto a screen.

Description of the Related Art

Conventionally, techniques are known that prevent an inappropriate black level of a printed material and expand the dynamic range of a projection image by projecting an image in an overlapped manner onto a screen including the printed material (Japanese Patent Laid-Open No. 2008-145915, Japanese Patent Laid-Open No. 2014-235295, and Japanese Patent Laid-Open No. 2013-167660).

Japanese Patent Laid-Open No. 2008-145915 describes a technique for generating a printed material from basic image information of an image captured by a camera, computer graphics, and the like, generating a projection image based on contrast information of the basic image information, and causing the projection image to overlap the printed material.

On the other hand. Japanese Patent Laid-Open No. 2014-235295 and Japanese Patent Laid-Open No. 2013-167660 describe a technique for projecting adjustment images and adjustment patterns for aligning images with one another when a plurality of projection apparatuses perform multi-projection or stack-projection of images. According to Japanese Patent Laid-Open No. 2014-235295 and Japanese Patent Laid-Open No. 2013-167660, a projection image is divided in units of certain areas, and adjustment images and adjustment patterns that have primary colors and their complementary colors are arranged alternately in stripes in an area in which images overlap each other.

However, according to Japanese Patent Laid-Open No. 2008-145915, a moving mechanism unit for the printed material is configured integrally with a projection unit so that the setting positions of the printed material and the projection image do not deviate from each other, and thus the degree of freedom in setting the printed material is low. Furthermore, according to Japanese Patent Laid-Open No. 2014-235295 and Japanese Patent Laid-Open No. 2013-167660, when alignment is performed by causing the printed material and the projection image to overlap each other, adjustment patterns are printed on the printed material, and thus an image cannot be printed on that portion.

SUMMARY OF THE INVENTION

The present invention has been made in consideration of the aforementioned problems, and realizes a technique with which a position deviation can be easily adjusted when causing a projection image to overlap an image included in a screen.

In order to solve the aforementioned problems, the present invention provides a projection apparatus, comprising: a projection unit configured to project an image onto a screen including a target image; a switching unit configured to switch to one of a first image for indicating a position deviation between a projection area in which the projection unit projects an image and the target image, and a second image for increasing contrast of the target image; and a control unit configured to control the projection unit so as to project an image in the projection area based on an image to which the switching unit has switched, wherein the first image is an image that has a predetermined relationship with colors of the target image.

In order to solve the aforementioned problems, the present invention provides a control method of a projection apparatus which has a projection unit configured to project an image onto a screen including a target image, the method comprising: switching to one of a first image for indicating a position deviation between a projection area in which the projection unit projects an image and the target image, and a second image for increasing contrast of the target image; and controlling the projection unit so as to project an image in the projection area based on the switched image, wherein the first image is an image that has a predetermined relationship with colors of the target image.

In order to solve the aforementioned problems, the present invention provides an information processing apparatus, comprising: a generation unit configured to generate a first image for indicating a position deviation between a projection area in which a projection apparatus projects an image and a target image, and a second image for increasing contrast of the target image; and a supply unit configured to supply one of the first image and the second image to the projection apparatus, wherein the first image is an image that has a predetermined relationship with colors of the target image.

In order to solve the aforementioned problems, the present invention provides a control method of an information processing apparatus, the method comprising: generating a first image for indicating a position deviation between a projection area in which a projection apparatus projects an image and a target image, and a second image for increasing contrast of the target image; and supplying one of the first image and the second image to the projection apparatus, wherein the first image is an image that has a predetermined relationship with colors of the target image.

In order to solve the aforementioned problems, the present invention provides a non-transitory computer-readable storage medium storing a program for causing a computer to function as a projection apparatus, comprising: a projection unit configured to project an image onto a screen including a target image; a switching unit configured to switch to one of a first image for indicating a position deviation between a projection area in which the projection unit projects an image and the target image, and a second image for increasing contrast of the target image; and a control unit configured to control the projection unit so as to project an image in the projection area based on an image to which the switching unit has switched, wherein the first image is an image that has a predetermined relationship with colors of the target image.

In order to solve the aforementioned problems, the present invention provides a non-transitory computer-readable storage medium storing a program for causing a computer to function as an information processing apparatus, comprising: a generation unit configured to generate a first image for indicating a position deviation between a projection area in which a projection apparatus projects an image and a target image, and a second image for increasing contrast of the target image; and a supply unit configured to supply one of the first image and the second image to the projection apparatus, wherein the first image is an image that has a predetermined relationship with colors of the target image.

According to the present invention, a position deviation can be easily adjusted when causing a projection image to overlap an image included in a screen.

Further features of the present invention will become apparent from the following description of exemplary embodiments (with reference to the attached drawings).

BRIEF DESCRIPTION OF THE DRAWINGS

FIG. 1C is a block diagram showing a configuration of an image processing unit according to the first embodiment.

FIG. 2 is a flowchart showing alignment processing at the time of projection according to the first embodiment.

FIGS. 4A and 4B are diagrams for describing a printed image and an alignment image.

FIG. 7A is a system configuration diagram according to a second embodiment.

FIG. 8 is a flowchart showing processing for acquiring projection plane color information according to the second embodiment.

FIG. 12 is a diagram for describing a relationship between a shape correction amount and a saturation value according to the third embodiment.

FIG. 14 is a diagram showing a relationship between pixel values of a printed image, an alignment image, and an overlap image.

FIG. 15 is a diagram showing a relationship between pixel values of a printed image, an alignment image, and an overlap image.

FIG. 16 is a diagram showing a relationship between pixel values of a printed image, an alignment image, and an overlap image.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

Note that each function block described in the present embodiments need not necessarily be individual hardware. That is to say, for example, the functions of some function blocks may be executed by one item of hardware. Furthermore, the function of one function block or the functions of a plurality of function blocks may be executed by coordinated operations of some items of hardware. In addition, the function of each function block may be executed by a computer program that has been deployed to a memory by a CPU.

First Embodiment

First, a first embodiment will be described with reference to FIGS. 1A and 1B to FIG. 6.

The following describes an example in which an image for position adjustment (hereinafter referred to as an image for adjustment) that has high visibility for a user is generated so that, when a projection apparatus projects a projection image in an overlapped manner onto a screen for projecting including a printed material, which is a print medium (e.g., paper) with an image, characters, and the like printed on, the user can easily adjust a position deviation between the image on the printed material and the projection image.

Figure 1A:
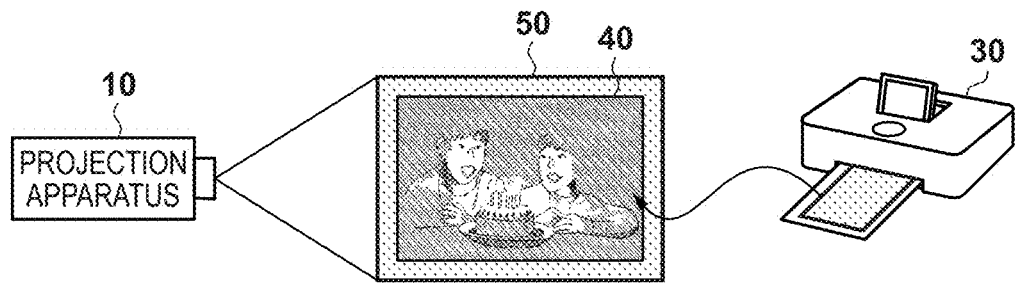
FIG. 1A is a system configuration diagram according to a first embodiment.

FIG. 1A shows a state where a projection apparatus 10 according to the present embodiment has caused a projection image to overlap a printed image 40.

With respect to the printed image 40, which is a print medium with an image and characters printed thereon by a printing apparatus 30 (e.g., a printer), the projection apparatus 10 projects an image onto a projection area 50 that includes the printed image 40. The projection apparatus 10 generates a projection image from an input image, and causes the projection image to overlap the printed image 40. Although the present embodiment describes an example in which an image is projected onto the printed image 40 assuming that a later-described enhancement target area is included within the range of the printed image 40, no limitation is intended in this regard. Furthermore, although the present embodiment is based on the premise that the range of the projection area 50 is larger than the range of the printed image 40, no limitation is intended in this regard, and the range of the printed image 40 may be as large as the projection area 50.

According to the present embodiment, the dynamic range of the printed image 40 can be improved and highly realistic contents can be provided by projecting an image in an overlapped manner onto the printed image 40.

<Apparatus Configuration>

Next, an overview of the configuration and functions of the projection apparatus 10 according to the present embodiment will be described with reference to FIG. 1B.

The projection apparatus 10 according to the present embodiment presents an image to the user by projecting light from a light source that has passed through light modulation elements onto a screen (projection plane) while controlling the light transmittances (light intensities) of the light modulation elements in accordance with an image to be displayed on the projection plane.

Figure 1B:
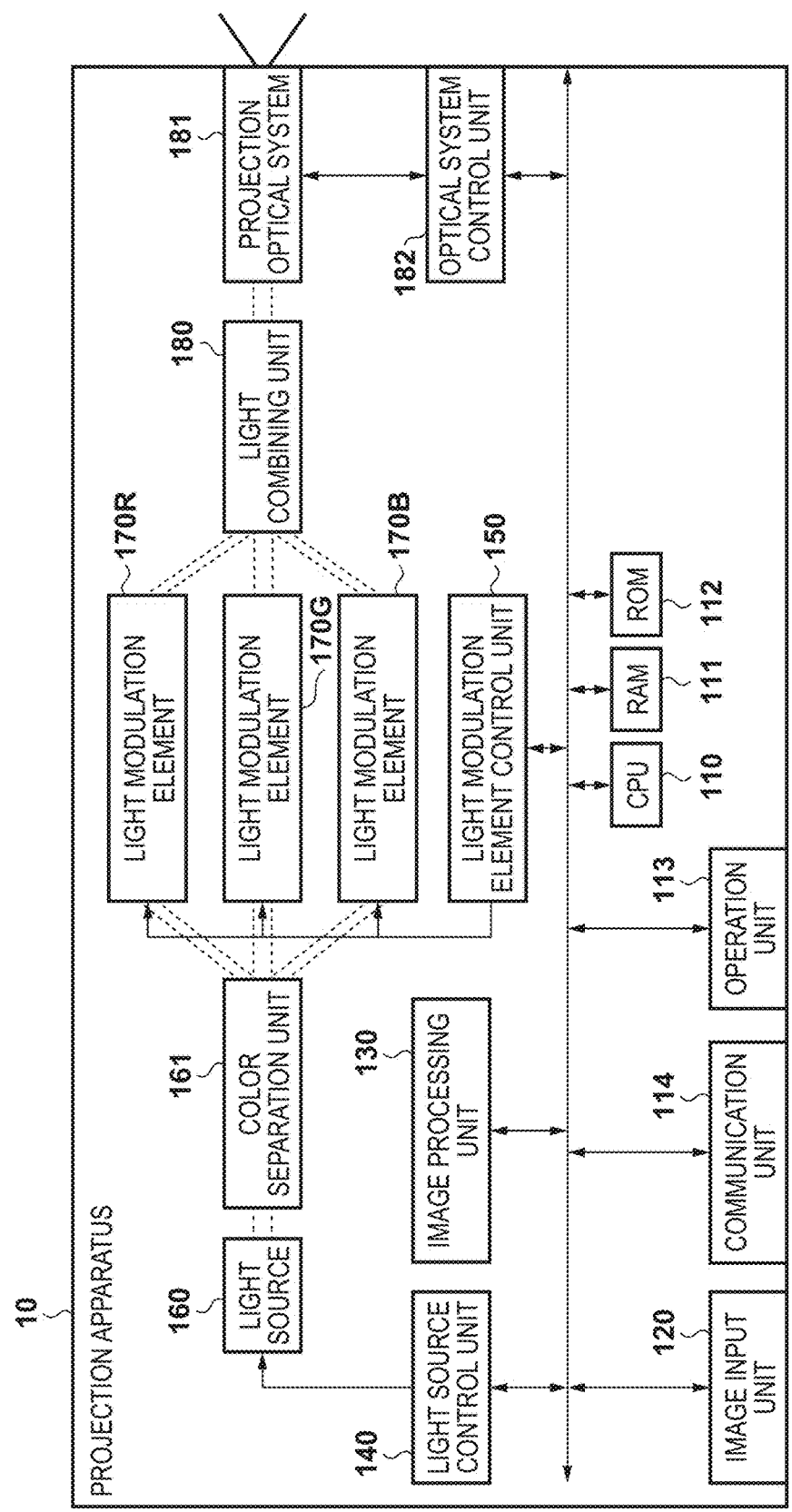
FIG. 1B is a block diagram showing a configuration of a projection apparatus according to the first embodiment.

In FIG. 1B, the projection apparatus 10 according to the present embodiment includes a CPU 110, a RAM 111, a ROM 112, an operation unit 113, a communication unit 114, an image input unit 120, and an image processing unit 130. The projection apparatus 10 also includes a light source control unit 140, a light modulation element control unit 150, a light source 160, a color separation unit 161, light modulation elements 170R, 170G, 170B, a light combining unit 180, a projection optical system 181, and an optical system control unit 182.

The CPU 110 controls operation blocks of the projection apparatus 10. The RAM 111 is a volatile memory that temporarily stores control programs and data as a working memory. The ROM 112 is a nonvolatile memory that stores control programs describing processing procedures performed by the CPU 110. The ROM 112 stores control programs and data, such as setting parameters for the operation blocks.

Furthermore, the CPU 110 can also temporarily store still image data and moving image data (hereinafter referred to as image data) received from the communication unit 114 and the image input unit 120, and reproduce their respective still images and moving images using a program stored in the ROM 112.

The operation unit 113 is composed of, for example, switches, dials, a touchscreen provided on a non-illustrated display unit, and the like, accepts a user operation, and transmits an operation signal to the CPU 110. Furthermore, the operation unit 113 may include, for example, a signal receiving unit (e.g., an infrared receiving unit) that receives an operation signal transmitted from a non-illustrated remote control and may output the received operation signal to the CPU 110. The CPU 110 controls the operation blocks of the projection apparatus 10 in response to an operation signal accepted from the operation unit 113.

The communication unit 114 receives a control signal, still image data, moving image data, and the like from an external apparatus, and may be, for example, a wireless LAN, a wired LAN, a USB, a Bluetooth®, and the like; it does not particularly limit a communication method. Furthermore, in a case where a terminal of the image input unit 120 is, for example, an HDMI® terminal, CEC communication may be performed via this terminal. Here, the external apparatus may be anything, for example, a personal computer, a camera, a mobile telephone, a smartphone, a hard disk recorder, a game console, or a remote control, as long as it can perform communication with the projection apparatus 10.

The image input unit 120 receives image information, such as a resolution and a frame rate, together with image data from a non-illustrated external apparatus. The image input unit 120 includes, for example, a composite terminal, an S image terminal, a D terminal, a component terminal, an analog RGB terminal, a DVI-I terminal, a DVI-D terminal, an HDMI® terminal, a DisplayPort® terminal, etc. Furthermore, upon receiving analog image data, the image input unit 120 converts a received analog signal into a digital signal and transmits the digital signal to the image processing unit 130. Here, the external apparatus may be anything, for example, a personal computer, a camera, a mobile telephone, a smartphone, a hard disk recorder, or a game console, as long as it can output image data. Furthermore, the image input unit 120 can also read image data from a memory device such as a USB memory and a memory card.

The image processing unit 130 is composed of, for example, a dedicated microprocessor, applies changing processing for the number of frames, the number of pixels, the shape of an image, and the like to image data received from the image input unit 120, and transmits the resultant image data to the light modulation element control unit 150. Note that the image processing unit 130 need not be a dedicated microprocessor, and the CPU 110 may execute processing similar to the processing performed by the image processing unit 130 using, for example, a program stored in the ROM 112. Furthermore, the image processing unit 130 can execute such functions as frame thinning processing, frame interpolation processing, resolution conversion (scaling) processing, distortion correction processing (keystone correction processing), luminance correction processing, and color correction processing. The image processing unit 130 can also generate a desired test pattern image and transmit the same to the light modulation element control unit 150. The image processing unit 130 can further apply the aforementioned changing processing to images (e.g., moving images and still images) reproduced by the CPU 110, in addition to the image data received from the image input unit 120. A detailed configuration of the image processing unit 130 will be described later.

Based on an image signal output from the image processing unit 130, the light modulation element control unit 150 controls a voltage applied to liquid crystals of pixels of the light modulation elements 170R, 170G, and 170B, and adjusts the transmittances of the light modulation elements 170R, 170G and 170B.

The light modulation element 170R is a liquid crystal element corresponding to red, and adjusts the transmittance with respect to red light among light that has been separated into red (R), green (G), and blue (B) by the color separation unit 161 from light output from the light source 160. The light modulation element 170G is a liquid crystal element corresponding to green, and adjusts the transmittance with respect to green light among light that has been separated into red (R), green (G), and blue (B) by the color separation unit 161 from light output from the light source 160. The light modulation element 170B is a liquid crystal element corresponding to blue, and adjusts the transmittance with respect to blue light among light that has been separated into red (R), green (G), and blue (B) by the color separation unit 161 from light output from the light source 160.

The light source control unit 140 is composed of, for example, a microprocessor for control that controls ON/OFF of the light source 160 and an amount of light therefrom. Note that the light source control unit 140 need not be a dedicated microprocessor, and the CPU 110 may execute processing similar to the processing performed by the light source control unit 140 using, for example, a program stored in the ROM 112. Furthermore, the light source 160 outputs light for projecting an image onto the non-illustrated screen for projecting. The light source 160 is, for example, a halogen lamp, a xenon lamp, a high-pressure mercury lamp, an LED light source, a laser diode, or a light source of a type that converts a light wavelength by exciting light emitted by a laser diode using phosphors and the like, and outputs light for projecting an image onto the screen. Note that as stated earlier, the screen according to the present embodiment includes the printed image 40 that has been printed on the print medium by the printing apparatus 30.

The color separation unit 161 is composed of, for example, a dichroic mirror and a prism, and separates light output from the light source 160 into red (R), green (G), and blue (B). Note that the color separation unit 161 is unnecessary when, for example, LEDs corresponding to the colors are used as the light source 160.

The light combining unit 180 is composed of, for example, a dichroic mirror and a prism, and combines red (R) light, green (G) light, and blue (B) light that have passed through the light modulation elements 170R, 170G and 170B. Then, the light obtained by combining red (R), green (G), blue (B), and infrared light (IR) components by the light combining unit 180 is sent to the projection optical system 181. At this time, the light modulation elements 170R, 170Q and 170B are controlled by the light modulation element control unit 150 so that they have light transmittances corresponding to the image data input from the image processing unit 130. Therefore, when the light combined by the light combining unit 180 is projected onto the screen by the projection optical system 181, the image input by the image processing unit 130 is displayed on the screen.

The optical system control unit 182 is composed of, for example, a microprocessor for control, and controls the projection optical system 181. Note that the optical system control unit 182 need not be a dedicated microprocessor, and the CPU 110 may execute processing similar to the processing performed by the optical system control unit 182 using, for example, a program stored in the ROM 112. Furthermore, the projection optical system 181 projects the combined light output from the light combining unit 180 onto the screen. The projection optical system 181 is composed of a plurality of lenses and actuators for lens driving, and can perform, for example, enlargement, reduction, shifting, and focus adjustment of a projection image by driving the lenses using the actuators.

Note that the image processing unit 130, light source control unit 140, light modulation element control unit 150, and optical system control unit 182 according to the present embodiment may be one or a plurality of microprocessors that can perform processing similar to the processing performed by these blocks. Alternatively, the CPU 110 may execute processing similar to the processing performed by these blocks using, for example, a program stored in the ROM 112.

<Configuration of Image Processing Unit>

Next, a detailed configuration of the image processing unit 130 will be described with reference to FIG. 1C.

An alignment image generation unit 1301 generates an alignment image that is suitable for performing alignment such that the projection area 50 completely overlaps the printed image 40 when a projection image is projected in an overlapped manner onto the printed image 40 on the projection plane.

A projection image generation unit 1302 generates a projection image by applying, to an image input to the image processing unit 130, image conversion processing that improves the dynamic range when the projection image is projected in an overlapped manner onto the printed image 40. Examples of the image conversion processing include color system conversion, gamma conversion, and 1D-LUT. Furthermore, the projection image generation unit 1302 can also generate a histogram of the input image.

A switcher 1303 switches between the images that have been respectively generated by the alignment image generation unit 1301 and the projection image generation unit 1302.

A distortion correction unit 1305 corrects a shape distortion at the time of projection of the projection image or the alignment image. Here, the shape distortion is corrected by projective transformation, affine conversion, and the like using a matrix. The distortion correction unit 1305 also issues a memory address of an image memory 1304 that is used in shape correction for the projection image, and performs image writing/reading control.

Specifically, the distortion correction unit 1305 temporarily writes the image input from the switcher 1303 to the image memory 1304, and upon completion of writing, reads pixel data of coordinates after shape distortion correction, which has been calculated based on the aforementioned conversion method, from the image memory 1304.

<Alignment Processing at the Time of Projection>

Next, alignment processing executed by the projection apparatus 10 according to the present embodiment at the time of projection will be described with reference to FIG. 2.

Note that the processing of FIG. 2 is realized by the CPU 110 deploying a program stored in the ROM 112 to a working area of the RAM 111 and controlling the operation blocks. Furthermore, the processing of FIG. 2 is executed upon accepting, via a non-illustrated remote control or the operation unit 113 by way of a user operation, an instruction for making a transition to an operation mode for projecting a projection image in an overlapped manner onto a printed image. The same goes for later-described FIGS. 2, 8, and 9.

In step S201, the CPU 110 determines whether the projection apparatus 10 is in a position adjustment mode for adjusting a position deviation between a printed image and a projection image. A condition for making a transition to the position adjustment mode will be described later. The CPU 110 proceeds to step S202 if it determines that the transition has been made to the position adjustment mode, and proceeds to step S206 if it determines that the transition has not been made.

In step S202, the CPU 110 acquires color information of the printed image on the projection plane.

In step S203, the CPU 110 generates an alignment image from the acquired color information of the printed image on the projection plane using the alignment image generation unit 1301. The alignment image generation unit 1301 generates a color complementary image based on the color information of the printed image on the projection plane acquired by the CPU 110, and uses the color complementary image as the alignment image.

In general, complementary colors denote colored light that can be made white by performing additive color mixture with respect to target colored light. The color complementary image refers to an image that, when projected in an overlapped manner onto the printed image on the projection plane, makes the appearance of the printed image on the projection plane closer to white than the appearance thereof under white-light illumination. Therefore, when the color complementary image is projected in an overlapped manner onto the printed image on the projection plane, the appearance becomes close to an achromatic color with zero saturation.

One example of the color complementary image is an image generated by converting the color information of the printed image on the projection plane into a complementary color thereof. Overlap projection is precisely color mixture by summation with the reflectance of the printed image on the projection plane, rather than additive color mixture; therefore, although performing overlap projection of an image generated by conversion into a complementary color does not necessarily produce a correct achromatic color, the image becomes close to the achromatic color in many cases. A specific example of this case will be described later. Note that other than the one described above, a variety of color complementary images are possible. A specific example thereof will be described later in another embodiment.

Furthermore, white can be white with a variety of color temperatures and correlated color temperatures. Typical examples include CIE (International Commission on Illumination) standard illuminant A (a correlated color temperature of 2856 K), standard illuminant C (a correlated color temperature of 6774 K), and standard illuminant D65 (a correlated color temperature of 6504 K), as well as energy white (a correlated color temperature of 5454 K), such as white used on a Japanese TV (NTSC-J) and PC (a correlated color temperature of 9300 K). Note that white is not limited to having a specific color temperature.

Furthermore, in the present embodiment, when the color complementary image is projected in an overlapped manner, it is not necessarily required to achieve an exact match with chromaticity coordinates of reference white that has been set in advance, and it is sufficient to become closer to reference white than under white-light illumination.

Below, a method of generating the color complementary image by converting the color information of the printed image on the projection plane, especially, an image generation method in an RGB color system will be described. An image generation method in another color system will be described later.

In the present embodiment, it will be assumed that RGB pixel values are linear values that are proportional to RGB light intensities. There is a case where a signal that is actually input as the color information of the printed image on the projection plane, and a signal that is output to the projection apparatus as the alignment image or the projection image, are signals that have undergone gamma conversion in accordance with a signal transmission standard and an apparatus standard. In this case, it is necessary that they have undergone processing for conversion into the aforementioned RGB linear values in a non-illustrated gamma correction unit and inverse gamma correction unit.

FIGS. 4A and 4B exemplarily show the printed image 40 and the alignment image 41 according to the present embodiment. Pixel values of image data are expressed using 8 bits. That is to say, the smallest value is 0, and the largest value is 255. Also, color blocks of primary colors red, green, and blue, and their complementary colors cyan, magenta, and yellow, are disposed. Image data of the printed image 40 is input to the image processing unit 130 as projection plane color information. The alignment image 41, which is to overlap the printed image 40, is generated by the alignment image generation unit 1301 of the image processing unit 130.

The alignment image 41 of FIG. 4B is an image in which the luminances and hues of the printed image 40 have been inverted, and is calculated from the following expressions 1-1, 1-2, and 1-3. In this case, as the luminances have been inverted from the printed image 40, the alignment image 41 is projected brightly in a low-brightness area of the printed image 40, and the alignment image 41 is projected darkly in a high-brightness area of the printed image 40.

$$R \text{ output} = 255 - R \text{ input} \tag{1-1}$$

$$G \text{ output} = 255 - G \text{ input} \tag{1-2}$$

$$B \text{ output} = 255 - B \text{ input} \tag{1-3}$$

To generate the alignment image 41, there are calculation methods other than the foregoing expressions 1-1, 1-2, and 1-3. As indicated by the following expressions 2-1, 2-2, and 2-3, increasing the luminances of the projection image as much as possible has the effect of increasing the visibility of a position deviation.

$$R \text{ output} = 255 - (R \text{ input} - \text{the smallest of } RGB) \tag{2-1}$$

$$G \text{ output} = 255 - (G \text{ input} - \text{the smallest of } RGB) \tag{2-2}$$

$$B \text{ output} = 255 - (B \text{ input} - \text{the smallest of } RGB) \tag{2-3}$$

Furthermore, as indicated by the following expressions 3-1, 3-2, and 3-3, the luminances may be saved and only the hues may be inverted.

$$R \text{ output} = \text{average of } RGB + (\text{average of } RGB - R \text{ input}) \tag{3-1}$$

$$G \text{ output} = \text{average of } RGB + (\text{average of } RGB - G \text{ input}) \tag{3-2}$$

$$B \text{ output} = \text{average of } RGB + (\text{average of } RGB - B \text{ input}) \tag{3-3}$$

However, when at least one of the RGB output values is a negative value, all of the RGB output values are offset such that an output value that has overflowed most significantly becomes zero. Alternatively, when at least one of the RGB output values is greater than 256, all of the RGB output values are offset such that an output value that has overflowed most significantly becomes 255.

With the expressions 1-1 to 3-3 exemplarily presented here, the alignment image 41 is generated by inverting the hues of the printed image 40. Therefore, when pixel-by-pixel alignment of the alignment image 41 and the printed image 40 in the projection area 50 has been performed appropriately, they are visually recognized as a white image, that is to say, an achromatic image on the entirety of the screen.

Note that the printed image 40 and the alignment image 41 that have been used in the foregoing description are simplified in order to make the description easy. The same goes for a case where the actual printed image 40 is a picture of nature or the like.

Furthermore, in the present embodiment, the projection apparatus 10 has 2.2-gamma characteristics as a standard. Therefore, as the conversion is performed in a linear space, the alignment image generation unit 1301 applies an inverse gamma of 2.2 to the input projection plane color information using the non-illustrated inverse gamma correction unit, and then applies a gamma of 2.2 using the non-illustrated gamma correction unit after calculating a complementary color image using the aforementioned expressions 1-1 to 3-3.

In step S204, the CPU 110 projects the alignment image.

Figure 5A:
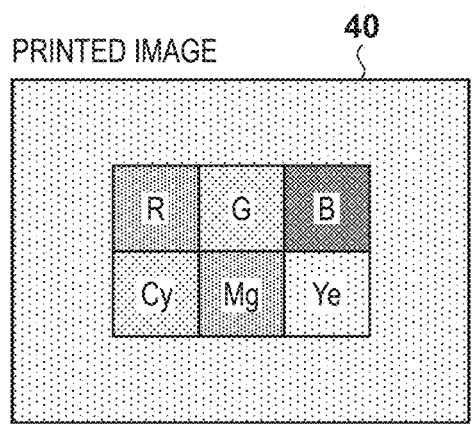
FIGS. 5A to 5C are diagrams for describing a printed image, an alignment image, and an overlap image.
Figure 5B:
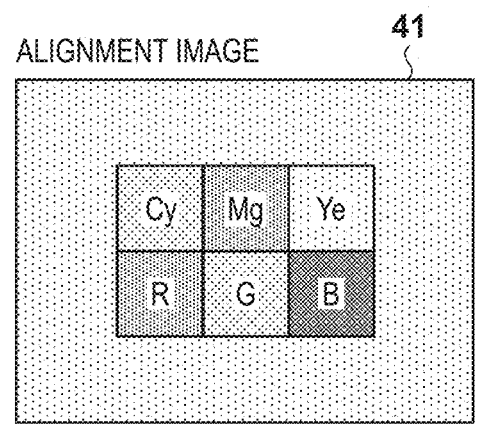
Figure 5C:
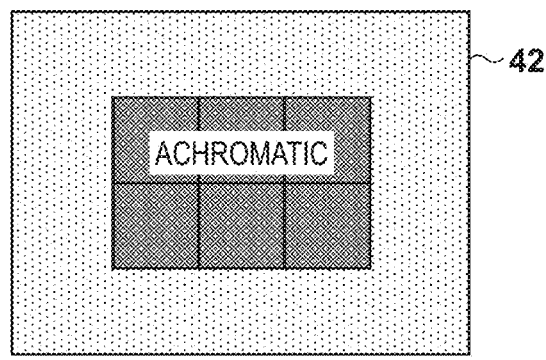

FIGS. 5A to 5C exemplarily show the printed image 40, the alignment image 41, and an overlap image 42, which is the printed image 40 and the alignment image 41 overlapping each other. Here, it will be assumed that ambient light is weaker than projected light from the projection apparatus 10, and the influence thereof will be omitted.

The projection apparatus 10 projects the projection area 50 of the alignment image 41 onto the printed image 40. The user instructs the CPU 110 to control a zoom optical system and a focus optical system of the projection optical system 181 via the operation unit 113. In response to the instruction from the operation unit 113, the CPU 110 sends a control signal for zoom and focus to the optical system control unit 182. In response to the control signal from the CPU 110, the optical system control unit 182 controls the projection optical system 181 as intended by the user. The user operates the focus optical system via the operation unit 113 such that the projection area 50 is focused on the printed image 40.

Next, the user operates the zoom optical system via the operation unit 113 so that the projection area 50 is projected in the same size as the printed image 40. Note that when there is a deviation between the relative positions of the printed image 40 and the projection area 50, the user may move the position at which the projection apparatus 10 is placed. Furthermore, when the projection optical system 181 has a shift optical system that moves the projection position of the projection area 50 in the horizontal direction or the vertical direction, the projection position of the projection area 50 may be moved by operating the shift optical system.

Here, when there is a shape distortion in the projection area 50 due to the relative positional relationship between the printed image 40 and the projection apparatus 10, the distortion correction unit 1305 performs deformation processing with respect to the projection area 50. The user performs an operation of correcting the image shape by moving the positions of the vertices of the projection area 50 at four corners, namely upper left, upper right, lower left, and lower right, to appropriate positions such that the printed image 40 and the projection area 50 overlap each other.

Specifically, the user issues an instruction for starting distortion correction processing via the operation unit 113, and selects a vertex at one of the four corners of the projection area 50. Then, the position of the vertex at one of the four corners of the projection area 50 selected via the operation unit 113 is moved to match the position of the same vertex at one of the four corners of the printed image 40. Based on the instruction from the operation unit 113, the CPU 110 sends a control signal for deformation processing to the distortion correction unit 1305. In response to the control signal from the CPU 110, the distortion correction unit 1305 performs deformation processing with respect to the input image. This is repeatedly performed similarly with respect to the remaining three vertices.

The user performs deformation processing with respect to the projection area 50 using the operation unit 113 so that the alignment image in the projection area 50 completely overlaps the printed image 40; the following describes how the deformation is performed while the user is viewing the printed image 40 and the projection area 50 with reference to FIGS. 5A to 5C.

FIGS. 5A to 5C exemplarily show the printed image 40, the alignment image 41, and the overlap image 42. The alignment image 41 is an image in which the luminances and hues have been inverted as has been described with reference to FIG. 4B. In a case where the printed image 40 is as shown in FIG. 5A, the alignment image generation unit 1301 generates the alignment image 41 shown in FIG. 5B using the aforementioned expressions 1-1, 1-2, and 1-3. Then, the printed image 40 and the alignment image in the projection area 50 are aligned by using a zoom function and a shift function of the projection optical system 181, and moving the position of the projection apparatus 10 as necessary. Furthermore, when the printed image 40 and the alignment image do not completely overlap each other, a shape correction function of the distortion correction unit 1305 is used. When the printed image 40 and the alignment image in the projection area 50 have completely overlapped each other in this way, the overlap image 42 becomes an image that is visually perceived as achromatic as shown in FIG. 5C.

FIG. 14 shows a relationship between RGB pixel values of the printed image, the alignment image, and the overlap image. In FIG. 14, the positions of the color blocks in each of the images shown in FIGS. 5A to 5C are denoted by pos1 to pos6 from upper left to lower right, and also, the RGB pixel values and the color coordinate values of represented colors (L*a*b* color system) of the printed image, the alignment image, and the overlap image at the respective positions, as well as the saturations (Cab*) calculated therefrom, are shown in a list. The RGB pixel values of the printed image are calculated as being directly proportional to the reflectance with respect to light of RGB primary colors. Whereas each color block in the printed image before overlap exhibits a high saturation of 50 to 134, the overlap image with the overlapping alignment image has a saturation of 0, which is completely achromatic. Furthermore, the overlap image has a brightness (L*) of 0. This is because the projection area 50, which is the alignment image, is in a complementary color relationship with the printed image 40 composed of color blocks that are respectively in pure RGB and CyMgY.

As compared to FIG. 14, FIGS. 15 and 16 exemplarily show a state where the color blocks in the printed image have slightly deviated from pure RGB and CyMgY, and gray is mixed therein. In FIG. 15, the color blocks in the printed image have intermediate colors with 25% of gray mixed with 50% of RGB and CyMgY. In this case also, when the alignment image in a complementary color relationship has been generated and overlapped the printed image, each color block in the printed image exhibits a high saturation of 28 to 56, whereas the overlap image has a saturation of 0, which is completely achromatic. In FIG. 15, as the brightness (L*) is 50, the color is not black but ash.

In FIG. 16, the percentage is slightly different, and 20% of gray is mixed with 50% of RGB and CyMgY. In this case also, when the alignment image has been generated and overlapped using the aforementioned method, each color block in the printed image before overlap exhibits a high saturation of 26 to 60, whereas the overlap image with the overlapping alignment image has a saturation of 6 to 11, which is close to an achromatic color. With the overlapping alignment image, the appearance becomes close to an achromatic color having a saturation of zero, although not completely achromatic.

Figure 13A:
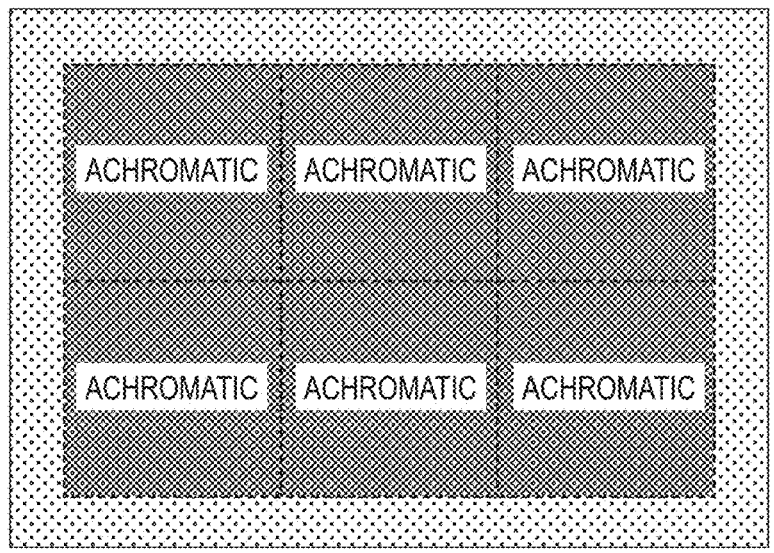
FIGS. 13A and 13B are diagrams for describing a positional relationship between a printed image and an alignment image.
Figure 13B:
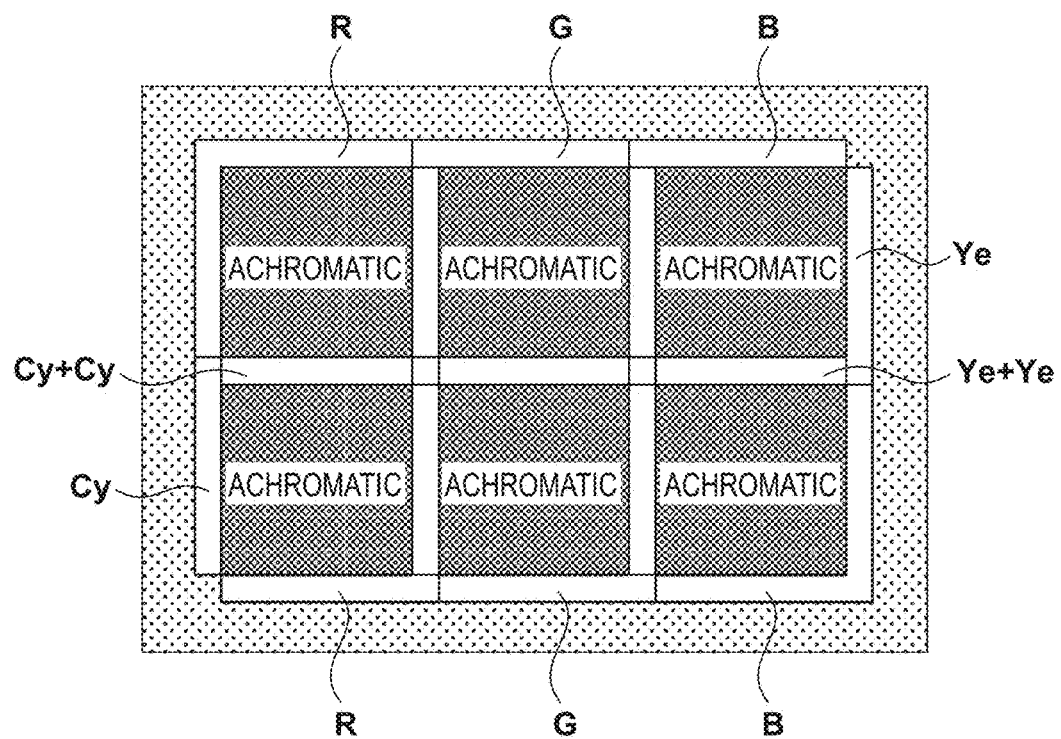

Here, returning again to the example in which the color blocks in the printed image are in pure RGB and CyMgY, FIG. 13B shows a display example of the overlap image in a state where the printed image 40 and the alignment image in the projection area 50 do not completely overlap each other.

FIGS. 13A and 13B show a portion composed of the color blocks that are respectively in R, G, B, Cy, Mg, and Ye in the projection area 50 in a state where the printed image 40 and the alignment image overlap each other. FIG. 13A shows a state where the printed image 40 and the alignment image in the projection area 50 completely overlap each other. Here, as the printed image 40 and the alignment image in the projection area 50 are in a complementary color relationship with each other, the overlap image is visually perceived as achromatic as stated earlier.

FIG. 13B shows a state where the alignment and shape distortion adjustment are insufficient, and the projection area 50 in which the alignment image is projected has deviated upward, downward, leftward, or rightward relative to the printed image 40. In FIG. 13B, an area in which the printed image 40 and the projection area 50 are aligned is achromatic; however, in an area in which they deviate from each other in position, a chromatic portion of the printed images 40 and the projection area 50 is displayed as is, or as a chromatic overlap pattern without a complementary color relationship. This makes it extremely easy for the user to recognize a position deviation when aligning the printed image 40 and the projection area 50.

Returning to FIG. 2, in step S205, the CPU 110 determines whether the position adjustment for the printed image and the alignment image by the user has been completed. Regarding whether the position adjustment has been completed, the alignment and shape correction of the projection area 50 in the alignment image relative to the printed image 40 are performed, and it is determined that the adjustment has been completed when the saturations have become lowest and the contrast in edge portions has become low.

Figure 6:
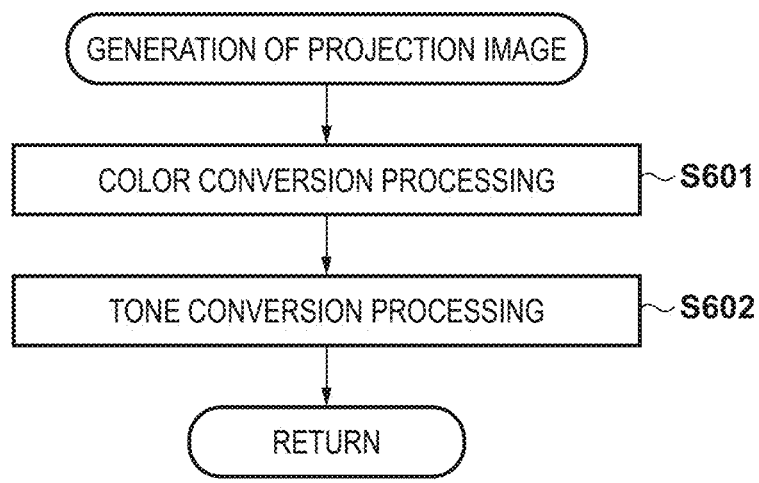
FIG. 6 is a flowchart showing processing for generating a projection image in FIG. 2.

In step S206, the CPU 110 generates the projection image from the input image using the projection image generation unit 1302. FIG. 6 shows processing for generating the projection image.

In step S601, the CPU 110 performs color conversion with respect to the input image using the projection image generation unit 1302 of the image processing unit 130. For example, the input image may be changed into a grayscale image by extracting only luminance components, or an RGB color system of the input image may be converted into an HLS color system, an L*a*b* color system, or the like by matrix conversion.

In step S602, the CPU 110 generates the projection image by performing tone conversion using the projection image generation unit 1302 of the image processing unit 130.

In the projection image according to the present embodiment, tone conversion has been performed by making dark portions black and bright portions white so as to increase the image contrast compared to the input image. A tone conversion method may use 1D-LUT, or may be performed through gamma conversion. Note that the tone conversion method is not limited in this way, and may be changed freely as intended by the user without acquiring the luminances of the projection plane.

Furthermore, although tone conversion processing is performed using 1D-LUT in the present embodiment, processing involving a gain and the like may be performed only for L (luminances) after conversion into the HLS color system, processing for improving the saturations may be performed together with processing involving a gain and the like for S (saturations), or both of these may be performed. After the processing, the HLS color system is inversely converted into the RGB color system.

Returning to FIG. 2, the CPU 110 projects the projection image using the projection optical system 181 in step S207.

As described above, according to the present embodiment, the projection apparatus 10 can generate the alignment image from the color information of the printed image on the projection plane, make it easy to visually recognize a position deviation between the printed image and the projection image on the projection plane, and appropriately assist the position adjustment performed by the user.

Note that in the foregoing embodiment, the enhancement target area is not limited to a printed material and may be, for example, a painting or a wall of a building as long as the projection image improves the dynamic range of the enhancement target area.

Furthermore, the color information of the printed image on the projection plane may be received from the printing apparatus 30. The color information for generating the projection image may be received from the printing apparatus 30, for example, via a network that connects between the communication unit 114 and the printing apparatus 30 in such a manner that they can communicate with each other using a wired cable or a wireless LAN, or via a non-illustrated memory card.

Furthermore, in a case where the color information of the printed image on the projection plane can be substituted by the input image, the input image may be used. Although it is assumed that the color information of the printed image on the projection plane is different from the input image in the present embodiment, only the input image may be used as long as the same outcome is achieved even if, for example, the input image is the same as the color information of the printed image on the projection plane.

Furthermore, the transition of the projection apparatus 10 to the position adjustment mode in step S201 may be made by detecting the movement of the projection apparatus 10 using a (acceleration) sensor and the like. Although the present embodiment has described an example in which the transition to the position adjustment mode is made by a user operation, the transition may be made by, for example, detecting the movement of the projection apparatus 10 using a non-illustrated acceleration sensor and the like provided in the projection apparatus 10. Furthermore, the transition may be made by the user's selection of the position adjustment mode using a non-illustrated remote control and the like.

<Processing for Generating Alignment Image>

Figure 3:
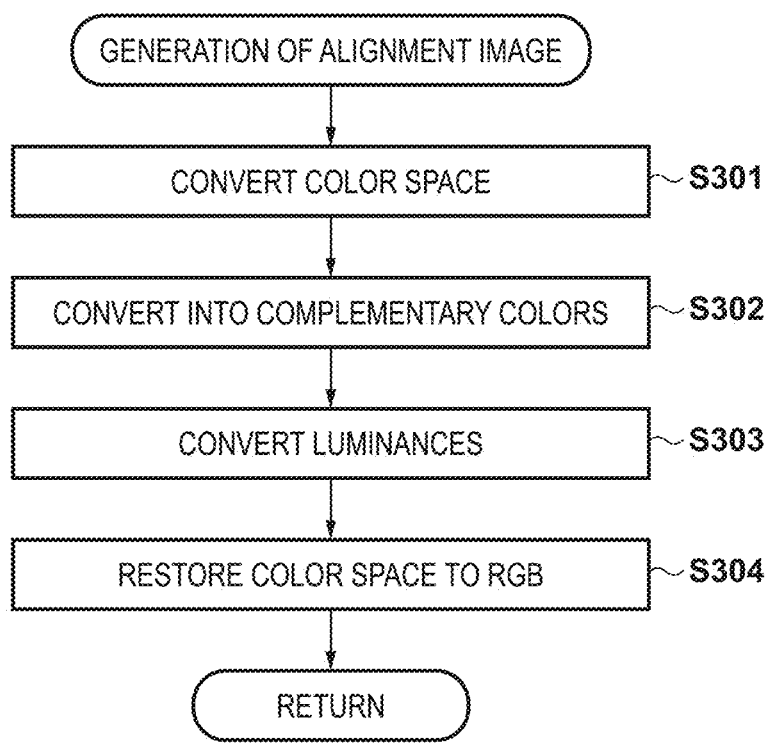
FIG. 3 is a flowchart showing processing for generating an alignment image in FIG. 2.

Next, a description is given of the details of processing for generating the alignment image in step S203 of FIG. 2 with reference to FIG. 3.

In step S301, using the alignment image generation unit 1301, the CPU 110 performs processing for converting the color information in the RGB color system of the printed image on the projection plane into a color system in which brightness information and color information are separated from each other.

To generate the alignment image in the L*a*b* color system, the RGB color system is converted into the L*a*b* color system. In practice, the RGB values are converted into an XYZ color system, and then converted into the L*a*b* color system. As this conversion method is known, a detailed description thereof, including a conversion expression and the like, will be omitted.

In an image converted into the L*a*b* color system, L* indicating brightness is separated from a* and b* indicating colors. Therefore, processing for color inversion is performed with respect to a* and b*, whereas processing for brightness is performed with respect to L*.

In step S302, using the alignment image generation unit 1301, the CPU 110 converts the color-converted image into complementary colors.

To convert colors into complementary colors in the L*a*b* color system, the signs of a* and b* are inverted as indicated by expressions 4-1 and 4-2.

$$a^*\text{input} = -a^*\text{output} \tag{4-1}$$

$$b^*\text{input} = -b^*\text{output} \tag{4-2}$$

In step S303, using the alignment image generation unit 1301, the CPU 110 converts (inverts or maximizes) the luminances (brightnesses) of the image converted into complementary colors.

To invert the luminances (brightnesses) that have been described using FIG. 4B and expressions 1-1, 1-2, and 1-3, expression 4-3 is used.

$$L^*\text{output} = 100 - L^*\text{input} \tag{4-3}$$

To generate an image in which the luminances (brightnesses) that have been described using FIG. 4B and expressions 2-1, 2-2, and 2-3 have been increased as much as possible, expression 4-4 is used.

$$L^*\text{output} = \text{the largest } L^* \tag{4-4}$$

The largest L* is the largest possible L value that can be achieved by a* and b* values calculated using expressions 4-1 and 4-2 in the L*a*b* color system.

To generate an image in which the luminances (brightnesses) that have been described using FIG. 4B and expressions 3-1, 3-2, and 3-3 have been saved, the input L* value is used as is.

In step S304, using the alignment image generation unit 1301, the CPU 110 performs color system conversion processing for restoring the color system to the RGB color system with respect to the luminance-converted image.

Note that although the color complementary image is calculated from the difference between the light intensity values of reference white and various color components in the foregoing embodiment, it can also be calculated using the inverse ratio as indicated by the following expressions 4-5 to 4-11.

$$\text{tentative } R \text{ output} = 255 \cdot (R \text{ input}/255) - 1 \quad (4\text{-}5)$$

$$\text{tentative } G \text{ output} = 255 \cdot (G \text{ input}/255) - 1 \quad (4\text{-}6)$$

$$\text{tentative } B \text{ output} = 255 \cdot (B \text{ input}/255) - 1 \quad (4\text{-}7)$$

$$\text{tentative max} = \max(\text{tentative } R \text{ output}, \text{tentative } G \text{ output}, \text{tentative } B \text{ output}) \quad (4\text{-}8)$$

$$\text{tentative } R \text{ output} = 255 \cdot (\text{tentative } R \text{ output}/\text{tentative max}) \quad (4\text{-}9)$$

$$\text{tentative } G \text{ output} = 255 \cdot (\text{tentative } G \text{ output}/\text{tentative max}) \quad (4\text{-}10)$$

$$\text{tentative } B \text{ output} = 255 \cdot (\text{tentative } B \text{ output}/\text{tentative max}) \quad (4\text{-}11)$$

Furthermore, although the foregoing embodiment has presented several methods of generating the color complementary image, a calculation method is not limited to these as long as the color complementary image is an image that has been generated in line with the aforementioned definition of the color complementary image. In addition, depending on the situation, the influence of ambient light may be corrected as necessary.

Note that regarding the range of complementary colors, only a part of the projection plane color information may be complementary colors, and the range of complementary colors need not be the entirety of the screen. For example, the range of complementary colors may be only around the luminance edges or in dark portions.

Second Embodiment

Next, a second embodiment will be described with reference to FIGS. 7A and 7B to FIGS. 10A to 10E.

The present embodiment describes an example in which an alignment image is generated by acquiring color information of a projection plane from an image obtained by capturing the projection plane.

FIG. 7A shows a state where a projection apparatus 10 according to the present embodiment has caused a projection image to overlap a printed image 40.

With respect to the printed image 40 printed by a printing apparatus 30, the projection apparatus 10 performs projection in a projection area 50 including the printed image 40. An image capturing apparatus 70 captures an image capture area 60 including the projection area 50. The projection apparatus 10 acquires projection plane color information from the image captured by the image capturing apparatus 70, generates the projection image, and causes the projection image to overlap the printed image 40. In the present embodiment, it will be assumed that an enhancement target area is the range of the printed image 40. Furthermore, in the present embodiment, although the range of the printed image 40, the projection area 50, and the image capture area 60 increase in range in this order, this is not necessarily required. The range of the printed image 40 may be the same area as the projection area 50.

According to the present embodiment, the dynamic range of the printed image 40 can be improved and highly realistic contents can be provided by acquiring color information through capturing of the projection plane using the image capturing apparatus 70 when the projection apparatus 10 causes the projection image to overlap the printed image 40 on the projection plane.

Note that although the present embodiment describes an example in which the projection image is projected in an overlapped manner onto the printed image 40 under the assumption that the enhancement target area is the printed image 40, the enhancement target area is not limited in this way.

Next, the configuration and functions of the projection apparatus 10 according to the second embodiment will be described with reference to FIG. 7B.

The projection apparatus 10 according to the present embodiment includes a captured image input unit 710 and a captured image processing unit 720 in addition to the components of FIG. 1B.

The captured image input unit 710 is connected to the image capturing apparatus 70, captures the surroundings of the projection area 50 of the projection apparatus 10 using the image capturing apparatus 70, and acquires an image signal from the image capturing apparatus 70. The image capturing apparatus 70 captures an image projected via a projection optical system 181 and the printed image 40 (captures the projection plane side). The captured image input unit 710 sends the image signal acquired from the image capturing apparatus 70 to a CPU 110. The CPU 110 temporarily stores the image signal to a RAM 111, and converts the image signal into still image data and moving image data using a program stored in a ROM 112. The captured image input unit 710 also sends a captured image to the captured image processing unit 720.

The captured image processing unit 720 applies image processing, such as color conversion and resolution conversion, to the captured image. For example, the captured image processing unit 720 can also receive the captured image from the captured image input unit 710, convert the captured image into the resolution of a liquid crystal panel using a scaler, and project the resultant captured image as a projection image.

The image capturing apparatus 70 includes a lens assembly having a zoom lens and a focusing lens that form an optical image of a subject, actuators that drive the lens assembly, and a microprocessor that controls the actuators. The image capturing apparatus 70 also includes an image sensor (e.g., a CCD and a CMOS) that converts a subject image formed by the lens assembly into an electrical signal, an A/D converter that converts an analog image signal acquired by the image sensor into a digital signal, etc.

Although the present embodiment describes a configuration in which the image capturing apparatus 70 is connected as an external apparatus to the projection apparatus 10, it may be built in the projection apparatus 10.

Next, projection processing according to second embodiment will be described with reference to FIGS. 8 to 10A to 10E.

Note that in the processing of FIG. 8, only the processing for acquiring projection plane color information in step S202 of FIG. 2 differs, and other processing is the same. Therefore, in the following description, processing other than step S202, that is to say, processing that is the same as the processing of FIG. 2, will be omitted, and a focus will be placed on the differences.

Figure 9:
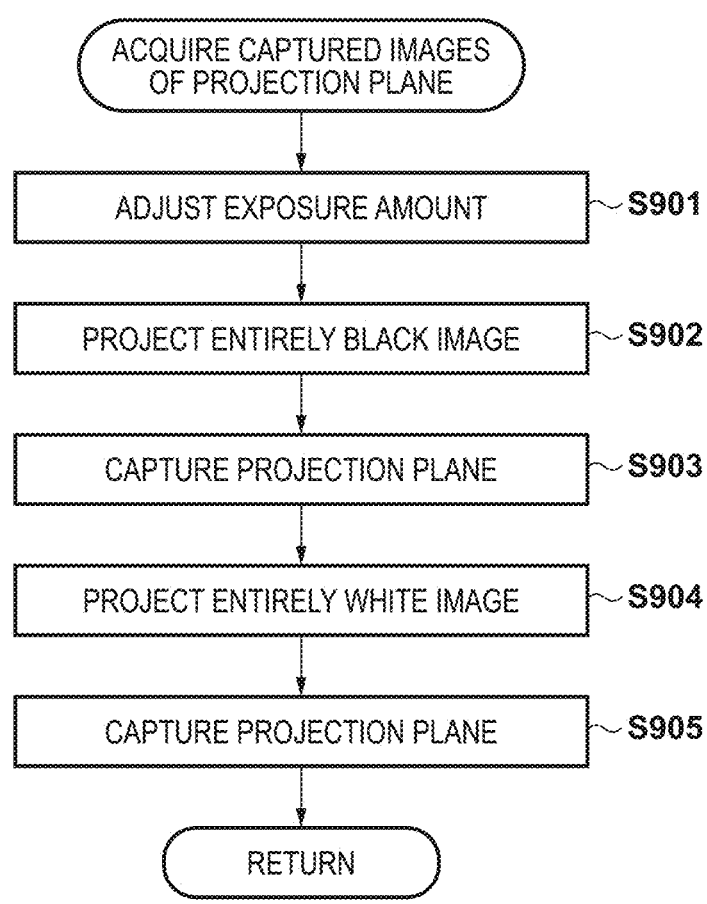
FIG. 9 is a flowchart showing processing for acquiring a captured image of a projection plane in FIG. 8.

In step S801, using the captured image input unit 710, the CPU 110 acquires captured images of the projection plane from the image capturing apparatus 70. Here, FIG. 9 shows processing for acquiring the captured images of the projection plane, which is executed by the microprocessor of the image capturing apparatus 70.

In step S901, the image capturing apparatus 70 performs exposure control for adjusting an exposure amount with respect to the plurality of captured images of the projection plane so that the tone values of the captured images do not become saturated. The exposure control performed by the image capturing apparatus 70 is realized by controlling an f-number, an exposure period, and a gain value of a captured image signal.

In the present embodiment, as a large area including the printed image 40 and the projection area 50 is captured, it is considered that there is a certain distance difference between the position nearest from and the position farthest from the image capturing apparatus 70 to the image capture area. Furthermore, as there may be a case where the image capturing apparatus 70 cannot be installed with its front facing the printed image 40, it is desirable to capture an image with the largest possible depth of field in order to acquire a favorable in-focus image in every image capture area 60. Therefore, in order to increase the depth of field, the image capturing apparatus 70 performs exposure control with the largest possible f-number so as to increase the exposure period accordingly. At this time, in order to prevent the occurrence of image blur, it is desirable to fix the image capturing apparatus 70 using a tripod and the like so that vibration and shaking do not occur.

First, the CPU 110 renders an image that makes the entire surface of the projection plane white (a tone value of 255 in the case of 8 bits; hereinafter referred to as an entirely white image) on the liquid crystal panel, and projects the same. Then, the image capturing apparatus 70 captures the printed image 40. Thereafter, the image capturing apparatus 70 controls exposure so that data of all captured pixels becomes bright in the range in which the data does not become saturated at the upper limit (e.g., 255 and 254) in the image capture area 60 that has been captured.

Specifically, as stated earlier, in order to increase the depth of field, exposure is controlled using the exposure period by making the f-number as large as possible. Then, once the f-number, the exposure period, and the gain value of the image signal, which are the elements of exposure, have been determined, an exposure value is fixed in and after step S902.

In step S902, the CPU 110 renders an image that makes the entire surface of the projection plane black (a tone value of 0; hereinafter referred to as an entirely black image) on the liquid crystal panel, and projects the same.

In step S903, the CPU 110 captures the projection area 50 using the image capturing apparatus 70. The image captured here corresponds to an image IMG_B shown in FIG. 10A.

In step S904, the CPU 110 renders an image that makes the entire surface of the projection plane white (a tone value of 255 in the case of 8 bits; hereinafter referred to as an entirely white image) on the liquid crystal panel, and projects the same.

In step S905, the CPU 110 captures the projection area 50 using the image capturing apparatus 70. The image captured here corresponds to an image IMG_W shown in FIG. 10B.

In the above-described manner, the captured images IMG_B and IMG_W of the projection plane are acquired.

Returning to FIG. 8, in step S802, the CPU 110 detects the projection area 50 of the projection apparatus 10 in the captured images IMG_B and IMG_W using the captured image processing unit 720. Specifically, a difference image IMG_D (FIG. 10C) is generated by obtaining the difference between the captured image IMG_B and the captured image IMG_W. Then, an area with a difference greater than or equal to a predetermined threshold is determined as the projection area 50 of the projection apparatus 10. Note that when the projection area 50 and the image capture area 60 match each other, the present processing need not be executed.

In step S803, using the captured image processing unit 720, the CPU 110 detects a printed image area from the image IMG_D. There is a detection method in which a user designates the printed image area via the operation unit 113. Alternatively, it is also possible to use the following method: an area in which a difference value detected from the image IMG_D in step S802 is smaller than or equal to a predetermined value or a flat area is set as a background area (e.g., a wall), and other remaining areas are used as the printed image area.

Note that when the printed image 40 matches the projection area 50 or the image capture area 60, the present processing need not be executed.

In step S804, using the captured image processing unit 720, the CPU 110 performs projective transformation with respect to the difference image IMG_D, thereby generating an image IMG_P (FIG. 10D) that has been converted so that the projection area 50 of the projection apparatus 10 detected in step S802 has a desired shape. For example, when the resolution of the liquid crystal panel is WUXGA (1920×1200), the projective transformation is performed so that the projection area 50 becomes a rectangle with an aspect ratio of 16:10. Furthermore, enlargement/reduction processing is also performed so that the resolution of the rectangle becomes the WUXGA size.

Note that when the image capture area 60 and the projection area 50 match each other, the present processing need not be executed.

Figure 10A:
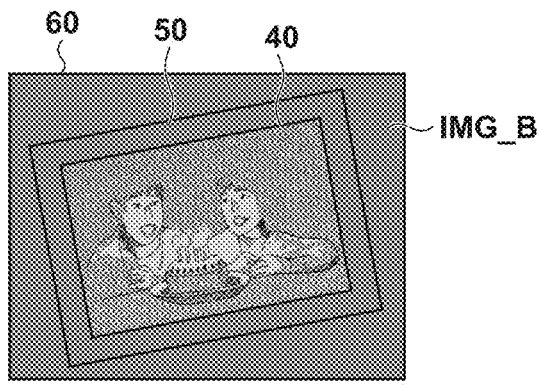
FIGS. 10A to 10E are diagrams exemplarily showing images that are acquired in the processing for acquiring the projection plane color information according to the second embodiment.
Figure 10D:
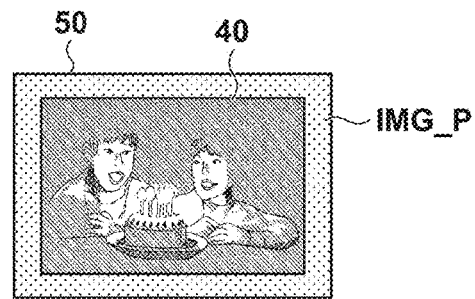
Figure 10B:
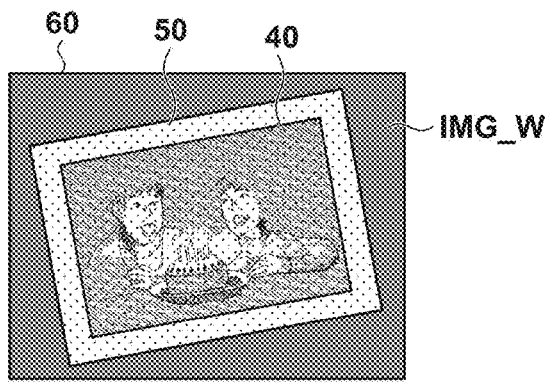
Figure 10E:
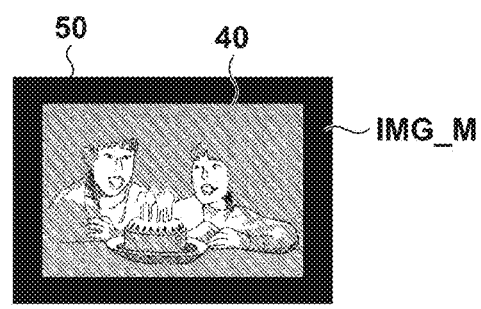
Figure 10C:
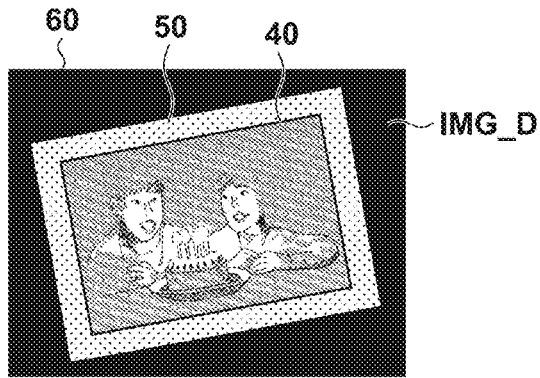
Figure 11:
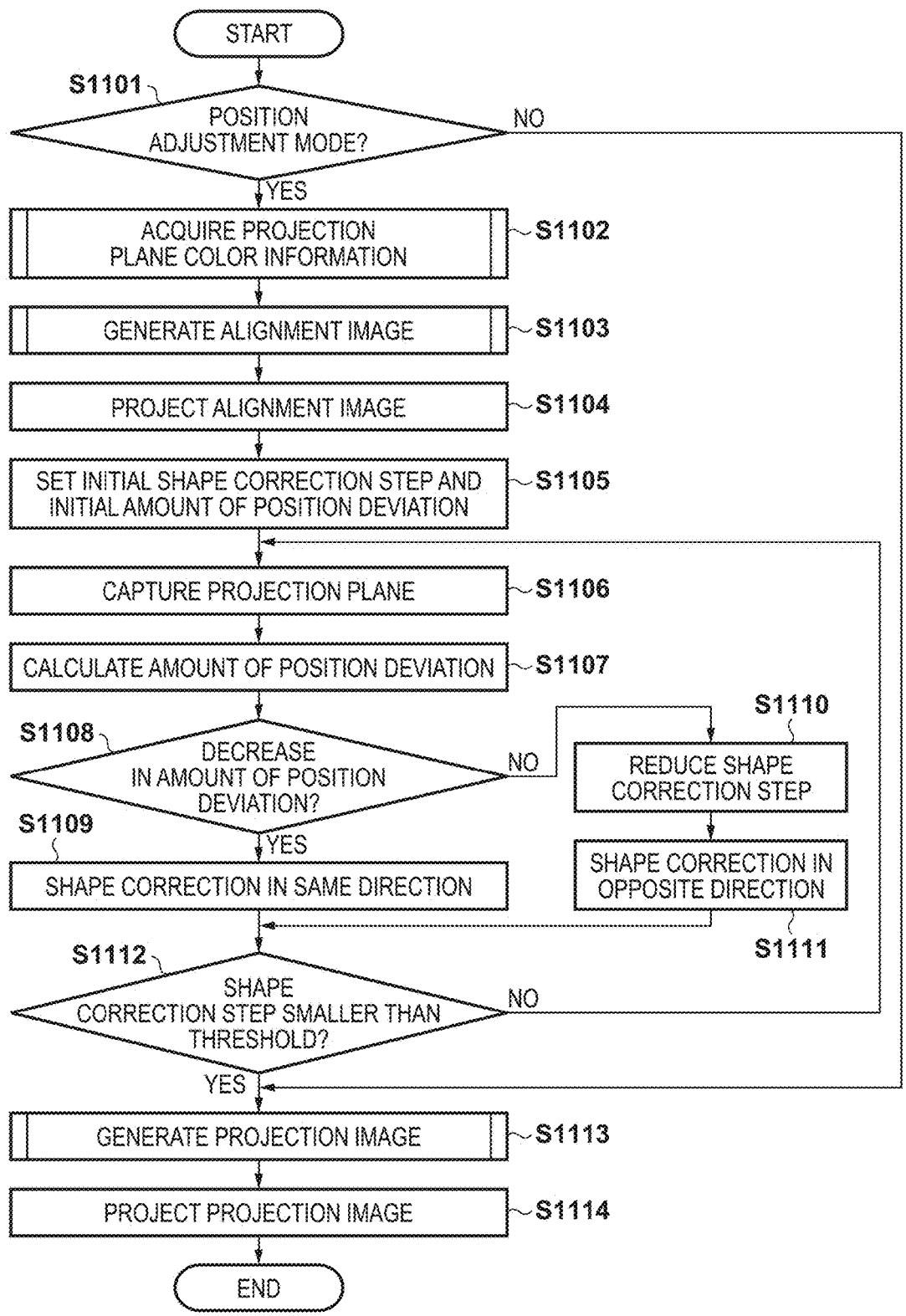
FIG. 11 is a flowchart showing alignment processing according to a third embodiment.

In step S805, using the captured image processing unit 720, the CPU 110 masks, with a tone value of zero, an area that has been set as a background area, which is a non-printing area other than the printed image area in the projection area detected in step S803. The image after the masking corresponds to an image IMG_M (FIG. 10E). The tone value used in the masking is not limited to zero, and can be set freely from black to white. In the present embodiment, the masking is performed with a tone value of zero in order to improve the dynamic range of and emphasize only the printed image 40.

In the above-described manner, color information of the projection plane can be acquired from a captured image.

Note that the color conversion in the generation of the projection image in step S206 of FIG. 2 is not executed with respect to the region to which the masking processing has been applied in step S805.

Furthermore, although an image obtained by cutting out the projection area 50 from the captured image, applying the projective transformation to the cut-out image to have the resolution of the liquid crystal panel, and applying the masking processing to the result of the projective transformation is used as the projection image in the present embodiment, no limitation is intended in this regard. For example, the printed image 40 may be cut out from the captured image and undergo the projective transformation to have the resolution of the liquid crystal panel, and the resultant image may be used as color information of the projection plane.

Third Embodiment

Next, a third embodiment will be described with reference to FIGS. 11 to 16.

The present embodiment describes an example in which a projection apparatus 10 calculates an amount of position deviation between a printed image and an alignment image from a captured image of a projection plane in a state where the printed image and the alignment image overlap each other, and automatically performs alignment based on the amount of position deviation.

Figure 7B:
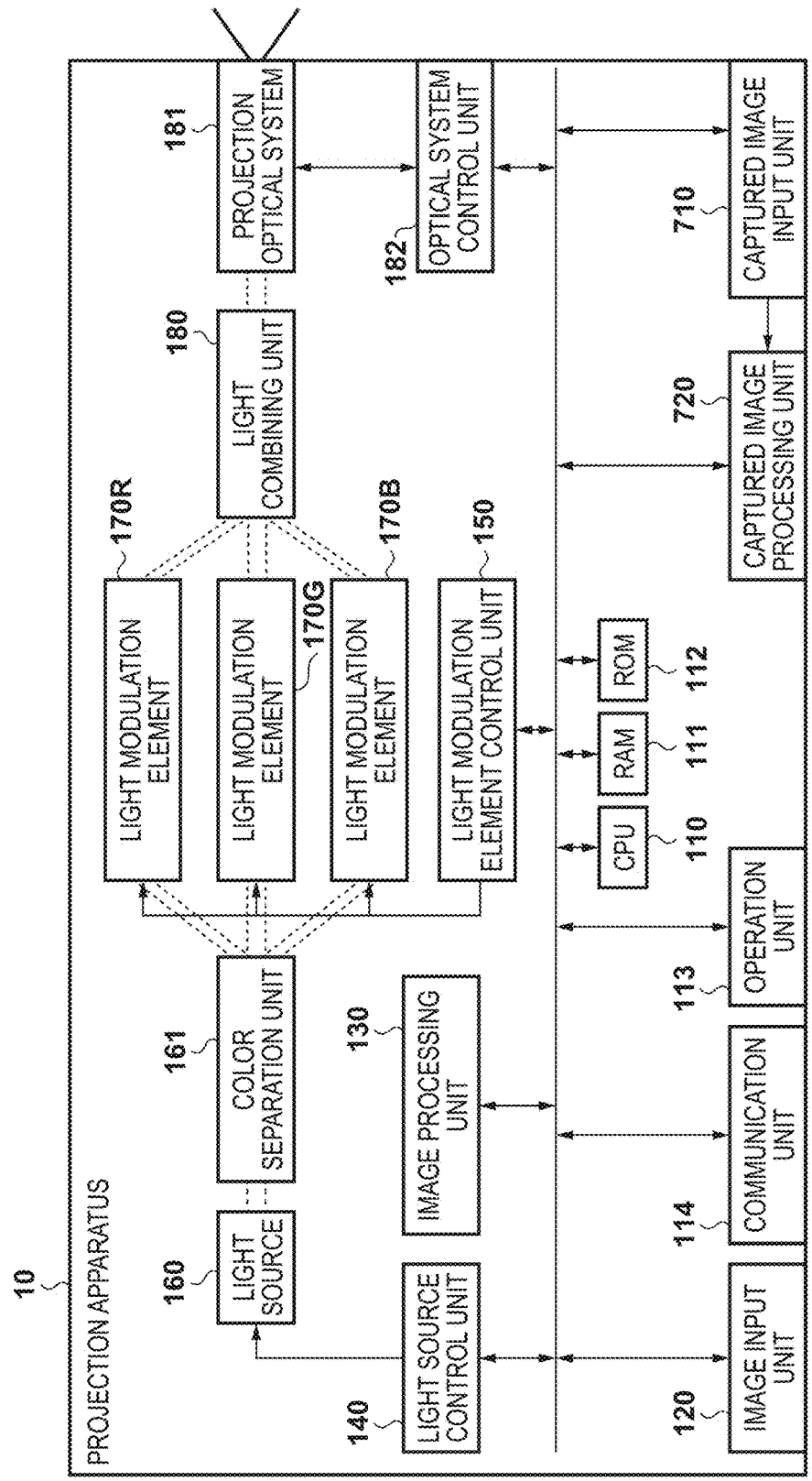
FIG. 7B is a block diagram showing a configuration of a projection apparatus according to the second embodiment.

Note that a system configuration and an apparatus configuration according to the present embodiment are similar to FIGS. 7A and 7B. Furthermore, in projection processing of FIG. 11, steps S1101, S1103, S1104, S1113, and S1114 are similar to steps S201, S203, S204, S206, and S207 of FIG. 2, and the details of step S1102 is similar to FIG. 8. In the following description, processing that is the same as FIGS. 2 and 8 will be omitted, and a focus will be placed on the differences.

In step S1105, a CPU 110 sets an initial shape correction step. This is an initial value of a correction amount corresponding to one step in shape correction control. Furthermore, an initial amount of position deviation is also set. This is used in calculation of a position deviation in the first-time control. These may be stored to a RAM 111, or may be stored to a ROM 112 in advance.

In step S1106, the CPU 110 captures the projection plane using an image capturing apparatus 70.

In step S1107, using a captured image processing unit 720, the CPU 110 calculates an amount of position deviation between the printed image and the alignment image from a color deviation amount of the captured image. FIG. 12 schematically shows a method of calculating an amount of position deviation from the captured image.

It can be determined that an amount of position deviation between a printed image 40 and a projection area 50 has become smallest in a state where the saturation has become lowest in image data of an image capture area 60 captured by the image capturing apparatus 70. That is to say, an amount of position deviation becomes smallest when the saturation on the screen on which the printed image and the position adjustment image overlap each other has become lowest.

Therefore, to obtain an amount of position deviation, it is sufficient to obtain a sum total of saturation values of all pixels in image data obtained by capturing the image capture area 60.

FIG. 12 shows a relationship between a saturation value and a shape correction amount. Here, the saturation value denotes a sum total of saturation values of respective image pixels in an image captured by the image capturing apparatus 70. The shape correction amount denotes an amount of shape correction in a case where shape correction is performed in a certain direction.

To calculate the saturation value from the RGB values of the image captured by the image capturing apparatus 70, the saturation value may be obtained from the following expression 5-1.

$$\text{saturation value} = |(|R-G|+|G-B|+|B-R|)| \quad (5\text{-}1)$$

In the L*a*b* color system, saturation may be obtained from the following expression 5-2.

$$\text{saturation value} = ((a^*)2+(b^*)2)^{1/2} \quad (5\text{-}2)$$

The present example uses a sum total value of saturation values of all pixels in the captured image; however, as this increases a calculation amount, for example, the captured image may be divided on a per-area basis, and only a sum total value in an appropriate area may be used.

A sum total of saturation values calculated in the above-described manner is used as an amount of position deviation.

The image captured by the image capturing apparatus 70 is input from a captured image input unit 710, and the value of the amount of position deviation is calculated in the captured image processing unit 720 and stored to the RAM 111.

In step S1108, the CPU 110 compares the amount of position deviation at the time of previous shape correction control, which has been read out from the RAM 111, with the current amount of position deviation. In a case where the first-time control is currently executed, the current amount of position deviation is compared with an initial value of the amount of position deviation stored in the RAM 111 or the ROM 112. If the current amount of position deviation is smaller than the previous amount of position deviation, the CPU 110 proceeds to step S1109. In FIG. 12, this corresponds to a state where the previous shape correction control uses a shape correction amount 1 and the current shape correction control uses a shape correction amount 2.

In step S1109, as it can be determined that shape correction is performed in the direction in which the amount of position deviation decreases, the CPU 110 continuously performs shape correction in the same direction by the initial shape correction step.

On the other hand, if the current amount of position deviation is larger than the previous amount of position deviation in step S1108, the CPU 110 proceeds to step S1110. In FIG. 12, this corresponds to a state where the previous shape correction control uses a shape correction amount 3 and the current shape correction control uses a shape correction amount 4. In step S1110, as it can be determined that shape correction is performed in the direction in which the amount of position deviation increases, that is to say, as it can be determined that a shape correction amount corresponding to the lowest saturation has been exceeded, the CPU 110 reduces a correction amount of the shape correction step (e.g., to half).

In step S1111, the CPU 110 inverts the direction of shape correction control, and performs shape correction by the shape correction step set in step S1110.

In step S1112, the CPU 110 determines whether the shape correction step set in step S1110 has become smaller than an appropriate threshold. If the shape correction step S is larger than the appropriate threshold, processing proceeds to step S1106; if the shape correction step S has become smaller, it is determined that position adjustment using shape correction has been sufficiently performed, and processing proceeds to step S1113.

As described above, according to the present embodiment, the projection apparatus 10 can calculate the amount of position deviation between the printed image and the alignment image from the captured image of the projection plane in a state where the printed image and the alignment image overlap each other, and automatically perform alignment based on the amount of position deviation.

Note that although the present embodiment has described an example in which the projection apparatus itself generates the alignment image, no limitation is intended in this regard; for example, it is also possible to adopt a configuration in which the projection apparatus is connected to an information processing apparatus (e.g., a personal computer and a smart device), and the information processing apparatus performs processing for generating the alignment image and supplies the alignment image to the projection apparatus. In this case, processing of the flowchart according to the present embodiment is realized by reading a program provided by an application. The application has a program for using fundamental functions of an OS installed in the information processing apparatus. Note that the OS of the information processing apparatus may have a program for realizing the processing according to the present embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-102957, filed May 24, 2017 which is hereby incorporated by reference herein in its entirety.

What is claimed is:

1. A projection apparatus, comprising:
a projection unit configured to project an image onto a screen including a target image;
a switching unit configured to switch to one of a first image for indicating a position deviation between a projection area in which the projection unit projects an image and the target image, and a second image for increasing contrast of the target image; and
a control unit configured to control the projection unit so as to project an image in the projection area based on an image to which the switching unit has switched,
wherein the first image is an image that has a predetermined relationship with colors of the target image.

2. The apparatus according to claim 1, wherein the first image is an image that causes an area in which the target image is provided to have predetermined colors when an image based on the first image is projected onto the target image on the screen.

3. The apparatus according to claim 1, further comprising:
an acquisition unit configured to acquire information related to the colors of the target image; and
a generation unit configured to generate the first image based on the information acquired by the acquisition unit.

4. The apparatus according to claim 3, wherein the generation unit generates the first image based on the information so that colors of the first image are in a complementary color relationship with the colors of target image.

5. The apparatus according to claim 3, wherein the generation unit converts the colors of the target image into a different color system based on the information, and generates the first image so that colors of the first image are in a complementary color relationship with the colors of target image after conversion.

6. The apparatus according to claim 3, wherein the generation unit generates the first image by converting the colors of the target image into light intensity values of respective primary colors corresponding thereto based on the information, and performing conversion in accordance with differences between the light intensity values and reference white.

7. The apparatus according to claim 3, wherein the generation unit generates the first image by converting the colors of the target image into light intensity values of respective primary colors corresponding thereto based on the information, and performing conversion in accordance with ratios between the light intensity values and light intensity values of respective primary colors composing reference white.

8. The apparatus according to claim 3, wherein the acquisition unit acquires second information related to luminance of the target image, and the generation unit generates the first image by converting a luminance distribution of the target image so as to invert the luminance distribution based on the second information.

9. The apparatus according to claim 3, wherein the target image on the screen has been printed by a printing apparatus, and the acquisition unit acquires the information from the printing apparatus.

10. The apparatus according to claim 3, wherein the acquisition unit acquires the information from an image input to the projection apparatus.

11. The apparatus according to claim 3, further comprising
an image capturing unit configured to capture the screen, wherein the acquisition unit acquires the information from an image obtained by capturing a projection plane.

12. The apparatus according to claim 11, further comprising
a detection unit configured to detect information related to an amount of a position deviation between the target image and the first image when an image based on the first image has been projected onto the target image on the screen,
wherein the generation unit deforms the first image in accordance with the amount of the position deviation.

13. The apparatus according to claim 1, wherein the switching unit switches between the first image and the second image in accordance with a user operation.

14. A control method of a projection apparatus which has a projection unit configured to project an image onto a screen including a target image, the method comprising:

switching to one of a first image for indicating a position deviation between a projection area in which the projection unit projects an image and the target image, and a second image for increasing contrast of the target image; and controlling the projection unit so as to project an image in the projection area based on the switched image, wherein the first image is an image that has a predetermined relationship with colors of the target image.

15. An information processing apparatus, comprising:

a generation unit configured to generate a first image for indicating a position deviation between a projection area in which a projection apparatus projects an image and a target image, and a second image for increasing contrast of the target image; and a supply unit configured to supply one of the first image and the second image to the projection apparatus, wherein the first image is an image that has a predetermined relationship with colors of the target image.

16. A control method of an information processing apparatus, the method comprising:

generating a first image for indicating a position deviation between a projection area in which a projection apparatus projects an image and a target image, and a second image for increasing contrast of the target image; and supplying one of the first image and the second image to the projection apparatus, wherein the first image is an image that has a predetermined relationship with colors of the target image.

17. A non-transitory computer-readable storage medium storing a program for causing a computer to function as a projection apparatus, comprising:

a projection unit configured to project an image onto a screen including a target image;

a switching unit configured to switch to one of a first image for indicating a position deviation between a projection area in which the projection unit projects an image and the target image, and a second image for increasing contrast of the target image; and a control unit configured to control the projection unit so as to project an image in the projection area based on an image to which the switching unit has switched, wherein the first image is an image that has a predetermined relationship with colors of the target image.

18. A non-transitory computer-readable storage medium storing a program for causing a computer to function as an information processing apparatus, comprising:

a generation unit configured to generate a first image for indicating a position deviation between a projection area in which a projection apparatus projects an image and a target image, and a second image for increasing contrast of the target image; and a supply unit configured to supply one of the first image and the second image to the projection apparatus, wherein the first image is an image that has a predetermined relationship with colors of the target image.

\* \* \* \* \*